(12) United States Patent
Kirkby et al.

(10) Patent No.: US 9,069,227 B2
(45) Date of Patent: Jun. 30, 2015

(54) METHODS AND APPARATUS TO CONTROL ACOUSTO-OPTIC DEFLECTORS

(75) Inventors: Paul A. Kirkby, Old Harlow (GB); K. M. Naga Srinivas Nadella, London (GB); R. Angus Silver, London (GB)

(73) Assignee: UCL BUSINESS PLC, London (GB)

( * ) Notice: Subject to any disclaimer, the term of this patent is extended or adjusted under 35 U.S.C. 154(b) by 0 days.

(21) Appl. No.: 14/112,332

(22) PCT Filed: Apr. 13, 2012

(86) PCT No.: PCT/GB2012/050824
§ 371 (c)(1),
(2), (4) Date: Oct. 17, 2013

(87) PCT Pub. No.: WO2012/143702
PCT Pub. Date: Oct. 26, 2012

(65) Prior Publication Data
US 2014/0029081 A1  Jan. 30, 2014

(30) Foreign Application Priority Data
Apr. 20, 2011 (GB) .................................. 1106787.3

(51) Int. Cl.
*G02F 1/33* (2006.01)
*G02B 21/00* (2006.01)
*G02F 1/11* (2006.01)

(52) U.S. Cl.
CPC ... *G02F 1/33* (2013.01); *G02F 1/11* (2013.01); *G02F 1/332* (2013.01); *G02B 21/0024* (2013.01); *G02F 2201/16* (2013.01); *G02F 2203/28* (2013.01); *G02F 1/113* (2013.01)

(58) Field of Classification Search
CPC .............. G02F 1/11; G02F 1/33; G02F 1/332
USPC .................. 359/305, 310, 285–287
See application file for complete search history.

(56) References Cited

U.S. PATENT DOCUMENTS

| 3,944,948 A | 3/1976 | Redman et al. |
| 4,217,036 A | 8/1980 | Chang |

(Continued)

FOREIGN PATENT DOCUMENTS

| EP | 0485191 | 5/1992 |
| EP | 0620468 | 10/1994 |

(Continued)

OTHER PUBLICATIONS

Reddy, G. D. et al: "Fast three-dimensional laser scanning scheme using acousto-optical deflectors," Journal of Biomedical Optics SPIE USA, vol. 1-, No. 6, Nov. 2005, pp. 64038-1, XP002471695, ISSN: 1083-3668.

(Continued)

*Primary Examiner* — Scott J Sugarman
*Assistant Examiner* — William R Alexander
(74) *Attorney, Agent, or Firm* — Harness, Dickey & Pierce, P.L.C.

(57) ABSTRACT

The invention is directed to an acousto-optic lens (AOL) and corresponding method. The AOL of the invention comprises a first and second acousto-optic deflector, each being arranged to support a respective acoustic wave. The AOL includes a driver for synthesizing first and second drive signals for the respective first and second acousto-optic deflectors. The driver is arranged to synthesize the drive signals so as to be phase-modulated by functions that can be expressed as a Taylor series having one or more coefficients greater than second order. The functions are preferably non-sinusoidal and have sufficient magnitude at the higher orders to effect one or more of fixed aberration correction, dynamic aberration correction and Z-scanning.

23 Claims, 10 Drawing Sheets

(56) References Cited

U.S. PATENT DOCUMENTS

| | | | |
|---|---|---|---|
| 4,371,964 | A | 2/1983 | Podmaniczky et al. |
| 4,435,041 | A | 3/1984 | Torok et al. |
| 4,443,066 | A | 4/1984 | Freyre |
| 4,514,056 | A | 4/1985 | Azgapetian |
| H884 | H | 2/1991 | Gottlieb |
| 5,034,613 | A | 7/1991 | Denk et al. |
| 5,197,074 | A | 3/1993 | Emmons, Jr. et al. |
| 5,296,700 | A | 3/1994 | Kumagai |
| 5,365,239 | A | 11/1994 | Stilwell, Jr. |
| 5,491,587 | A | 2/1996 | Iwaki et al. |
| 5,644,437 | A | 7/1997 | Maruyama et al. |
| 5,646,411 | A | 7/1997 | Kain |
| 5,680,252 | A | 10/1997 | Sitter, Jr. et al. |
| 5,825,497 | A | 10/1998 | Kim |
| 5,946,141 | A | 8/1999 | Harrigan |
| 6,166,385 | A | 12/2000 | Webb et al. |
| 6,285,507 | B1 | 9/2001 | Sakamoto |
| 6,307,665 | B1 | 10/2001 | Kim et al. |
| 6,344,653 | B1 | 2/2002 | Webb et al. |
| 6,473,233 | B1 | 10/2002 | Iizuka |
| 6,587,255 | B2 | 7/2003 | Davidson et al. |
| 6,906,824 | B1 | 6/2005 | Kamikubo et al. |
| 8,294,977 | B2 | 10/2012 | Kirkby et al. |
| 2002/0030890 | A1 | 3/2002 | Kato et al. |
| 2002/0057642 | A1 | 5/2002 | Kim et al. |
| 2002/0136524 | A1 | 9/2002 | Agha Riza |
| 2002/0141035 | A1* | 10/2002 | Davidson et al. ............ 359/285 |
| 2002/0149769 | A1 | 10/2002 | Roorda et al. |
| 2002/0149856 | A1 | 10/2002 | Chen et al. |
| 2003/0156323 | A1 | 8/2003 | Overbeck |
| 2005/0045814 | A1 | 3/2005 | Shimomura et al. |
| 2005/0061981 | A1 | 3/2005 | Allen et al. |
| 2005/0117221 | A1 | 6/2005 | Ogawa |
| 2005/0226557 | A1 | 10/2005 | Trutna et al. |
| 2005/0259306 | A1 | 11/2005 | Broome et al. |
| 2005/0263690 | A1 | 12/2005 | Araya et al. |
| 2005/0279807 | A1 | 12/2005 | Johnson |
| 2006/0056062 | A1 | 3/2006 | Cheng |
| 2006/0071143 | A1 | 4/2006 | Saggau et al. |
| 2006/0087737 | A1 | 4/2006 | Choi et al. |
| 2008/0180782 | A1 | 7/2008 | Kump et al. |

FOREIGN PATENT DOCUMENTS

| | | |
|---|---|---|
| EP | 0899603 | 3/1999 |
| EP | 1043615 | 10/2000 |
| EP | 1184855 | 3/2002 |
| EP | 1467235 | 10/2004 |
| EP | 1 587 185 A | 10/2005 |
| EP | 1587185 | 10/2005 |
| EP | 1596283 | 11/2005 |
| EP | 1862838 | 12/2007 |
| EP | 1870762 | 12/2007 |
| FR | 2708355 | 2/1995 |
| FR | 2708355 A | 2/1995 |
| GB | 2 119 109 A | 11/1983 |
| GB | 2119109 | 11/1983 |
| GB | 2368656 | 5/2002 |
| JP | S63194236 A | 8/1988 |
| JP | 07335526 A | 12/1995 |
| JP | 08328050 A | 12/1996 |
| JP | 11218682 A | 8/1999 |
| JP | 2004-535596 A | 11/2004 |
| JP | 2004535596 A | 11/2004 |
| WO | WO-02057811 | 7/2002 |
| WO | WO-03046613 | 6/2003 |
| WO | WO-2006042130 | 4/2006 |
| WO | WO-2008/032061 A2 | 3/2008 |
| WO | WO-2008032061 A2 | 3/2008 |
| WO | WO-2010076579 A1 | 7/2010 |

OTHER PUBLICATIONS

Iyer, V et al: "Compensation of spatial and temporal dispersion for acousto-optic multiphoton laser-scanning microscopy," Journal of Biomedical Optics SPIE USA, vol. 8, No. 3, Jul. 2003, pp. 460-471, XP002471781, ISSN: 1083-3668.

International Search Report regarding International Application No. PCT/GB2009/000061 dated Apr. 20, 2009.

International Search Report regarding International Application No. PCT/GB2007/003455 dated Aug. 11, 2008.

Bewersdorf, J., Pick, R., and hell, S.W. (1998) Multifocal Multiphoton Microscopy. Optics Letters 23, 655-657.

Botcherby, E.J., Juskaitis, R., Booth, M.J., and Wilson, T. (2007). Aberration-Free Optical Refocusing In High Numerical Aperture Microscopy. Optics Letters 32 (14), 2007-2009.

Carter, A.G., and Sabatini, B.L. (2004). State-Dependent Calcium Signaling in Dendritic Spines of Striatal Medium Spiny Neurons. Neuron 44, 483-493.

Chaigneau, E., Oheim, M., Audinat, E., and Charpak, S. (2003). Two-Photon Imaging of Capillary Blood Flow in Olfactory Bulb Glomeruli. Proc Natl Acad Sci U S A 100, 13081-13086.

Cossart, R., Aronov, D., and Yuste, R. (2003). Attractor dynamics of network UP states in the neocortex. Nature 423, 283-288.

Denk, W., Piston, D.W., and Webb, W.W. (1995). Two photon molecular excitation in laser-scanning microscopy. In Handbook of Confocal microscopy, J.B. Pawley, ed. (Plenum), pp. 445-458.

Denk, W., Strickler, J.H., Webb, W. W. (1990). Two-Photon Laser Scanning Fluorescence Microscopy. Science, New Series, 248 (4951), 73-76.

Denk, W., and Svoboda, K. (1997). Photon upmanship: why multiphoton imaging is more than a gimmick. Neuron 18, 351-357.

DiGregorio, D.A. Nielsen, T.A., and Silver, R.A. (2004). Investigation of Synaptic Ampa Receptors with Glutamate Uncaging using a Diffraction-Limited UV Spot. Online Abstact Society for Neuroscience Program No. 404.4.

DiGregorio, D.A., Rothman, J.S., Nielsen, T.A., and Silver, R.A., (2007). Desensitization Properties of AMPA Receptors at the Cerebellar Mossy Fiber-Granule Cell Synapse Journal of neuroscience, 27(31), 8344-8357.

Fan, G.Y., Fujisaki, H., Miyawaki, A., Tsay, R.K., Tsien, R.Y., and Ellisman, M.H. (1990). Video-rate scanning two-photon excitation fluorescence microscopy and ratio imaging with cameleons. Biophys J 76, 2412-2420.

Gobel, W., Kampa, B.M. and Helmchen, F. (2007). Imaging cellular network dynamics in three dimensions using fast 3D laser scanning. Nature Methods 4 (1), 73-79.

Hopt, A., and Neher, E. (2001). Highly nonlinear photodamage in two-photon fluorescence microscopy. Biophys J 80, 2029-2036.

Iyer V, Hoogland TM, Saggau P (2006) Fast functional imaging of single neurons using random-access multiphoton (RAMP) microscopy. Journal of Neurophysiology 95:535-545.

Kaplan, A., Friedman, N., and Davidson, N. (2001). Acousto-Optic Lens with Very Fast Focus Scanning. Optics Letters 26, 1078-1080.

Kiskin, N. I., Chillingworth, R., McCray, J.A., Piston, D., and Ogden, D. (2002). The efficiency of two-photon photolysis of a "caged" fluorophore, o-1-(2-nitrophenyl) ethylpyranine, in relation to photodamage of synaptic terminals. Eur Biophys J 30, 588-604.

Kiskin, N.I. and Ogden, D. (2002. Two-photon excitation and photolysis by pulsed laser illumination modelled by spatially non-uniform reactions with simultaneous diffusion. Eur Biophys J 30, 571-587.

Koester, H.J., Baur, D., Uhl, R., and Hell, S.W. (1999). Ca2+fluorescence imaging with pico- and femtosecond two-photon excitation: signal and photodamage. Biophys J 77, 2226-2236.

Lechleiter, J.D., Lin, D.T., and Sieneart, I. (2002). Multi-photon laser scanning microscopy using an acoustic optical deflector. Biophys J 83, 2292-2299.

Margrie, T.W., Meyer, A.H., Caputi, A., Monyer, H., Hasan, M.T., Schaefer, A.T., Denk, W., and Brecht, M. (2003). Targeted whole-cell recordings in the mammalian brain in vivo. Neuron 39, 911-918.

Matsuzaki, M., Ellis-Davies, G.C., Nemoto, T., Miyashita, Y., Iino, M., and Kasai, H. (2001). Dendritic Spine Geometry is Critical for AMPA receptor expression in Hippocampal CA1 pyramidal neurons. Nat Neurosci 4, 1086-1092.

(56) References Cited

OTHER PUBLICATIONS

Ngoi, B.K.A., Venkatakrishnan, K., Tan, B., Stanley, P., and Lim, L.E.N. (2001). Angular dispersion compensation for acousto-optic devices used for ultrashort-pulsed laser micromachining. Optics Express 9, 200-206.

Oheim, M., Beaurepaire, E., Chaigneau, E., Mertz, J., and Charpak, S. (2001). Two-photon microscopy in brain tissue; parameters influencing the imaging depth. J. Neurosci Methods 111, 29-37.

Pawley, J.B. (1995). Handbook of Biological Confocal Microscopy, Second edn (New York, Plenum Press).

Reddy D & Saggau P (2007) Fast Trhee-Dimensional Random Access Multi-Photon Microscopy for Functional Recording of Neuronal Activity, Proceedings of SPIE, vol. 6630 Confocal, Multiphoton, and nonlinear Microscopic Imaging III, Tony Wilson, Ammasi Periasamy, Editors, 66301A.

Reddy D & Saggau P (2007) Development of a random access multiphoton microscope for fast three-dimensional functional recording of neuronal activity, Proceedings of SPIE vol. 6443 Three-Dimensional and Multidimensional Microscopy: Image Acquisition and Processing XIV, Jose-Angel Conchello, Carol J. Cogswell, Tony Wilson, Editors, 64430U.

Roorda, R.D., Hohl, T.M., Toledo-Crow, R., and Miesenbock, G. (2004). Video-rate nonlinear microscopy of neuronal membrane dynamics with genetically encoded probes. J. Neurophysiol 92, 609-621.

Salome R, Kremer Y, Dieudonne S, Leger JF, Krichevsky O, Wyart C, Chatenay D, Bourdieu L. (2006) Ultrafast Random-Access Scanning in Two-Photon Microscopy Using Acousto-Optic Defelctors. Neurosci Methods. Jun. 30; 154 (1-2): 161-174.

Smith, M.A., Ellis-Davies, G.C., and Magee, J.C. (2003). Mechanism of the distance-dependent scaling of Schafer collateral synapses in rat CA1 pyramidal neurons. J Physiol 548, 245-258.

Stosiek, C., Garaschuk, O., Holthoff, K., and Konnerth, A. (2003). In vivo two-photon calcium imaging of neuronal networks. Proc Natl Acad Sci U S A 100, 7319-7324.

Young E H, Huey C H & Harrison L (1990) Optically Rotated long Time Aperture TeO2 Bragg cell. Proceedings of SPIE vol. 1296 Advances in Optical information processing IV, 304-315.

Zipfel, W.R., Williams, R.M., and Webb, W.W. (2003). Nonlinear magic: Multiphoton Microscopy in the Biosciences. Nat Biotechnol 21, 1369-1377.

Notice of Reason for Rejection regarding Japanese Patent Application No. 2009-527885 mailed Jun. 5, 2012.

Office Action regarding Japanese Patent Application No. 2009-527885 mailed Jun. 5, 2012. Translation provided by J.A. Kemp.

Office Action regarding U.S. Appl. No. 12/440,809 mailed Mar. 22, 2012.

International Search Report for PCT/GB2012/050824, mailed Jun. 22, 2012; ISA/EP, with Great Britain Search Report for priority application GB11006787.3, dated Aug. 11, 2011.

BR Brown et al. "Acoustic Light Deflector Chromatic Variation Compensation." Feb. 1, 1971.

European Search Report regarding Application No. 13170153.4-1903, dated Jul. 16, 2013.

European Search Report regarding Application No. 13170151.8-1903, dated Jul. 15, 2013.

European Search Report regarding Application No. 13170156.7-1903, dated Jul. 11, 2013.

Kirkby, P.A., et al. "A compact acousto-optic lens for 2D and 3D femtosecond based 2-photon microscopy." Optics Express Optical Society of America USA, vol. 18, No. 13, Jun. 11, 2010, pp. 13721-13745, XP000002654264, ISSN: 1094-4087.

International Search Report regarding PCT/GB2001/000608, mailed Aug. 11, 2011; ISA/EP with Great Britain Search Report for priority application GB1006679.3, dated Jul. 28, 2010.

Kirkby, P.A., et al., "A compact acousto-optic lens for 2D and 3D femtosecond based 2-photon microscopy", Optics Express Optical Society of America USA, vol. 18, No. 13, Jun. 11, 2010, pp. 13721-13745, XP000002654264, ISSN: 1094-4087.

Kaplan, A., et al., "Acousto-Optic Lens with Very Fast Focus Scanning", Optics Letters, OSA, Optical Society of America, Washington, DC, US, vol. 26, No. 14, Jul. 15, 2001, pp. 1078-1080, XO001103640, ISSN: 0146-1080.

International Search Report for PCT/GB/2001/000608, mailed Aug. 11, 2011; ISA/EP with Great Britain Search Report for priority application GB1006679.3, dated Jul. 28, 2010.

Great Britain Search Report for priority Application No. GB0800333.7 dated May 8, 2008.

Great Britain Search Report for priority Application No. GB0617945.1 dated Aug. 15, 2007.

International Search Report regarding PCT/GB2011/000608 mailed Aug. 16, 2011.

\* cited by examiner

METHODS AND APPARATUS TO CONTROL ACOUSTO-OPTIC DEFLECTORS

CROSS-REFERENCE TO RELATED APPLICATIONS

This application is a 371 U.S. National Stage of International Application No. PCT/GB2012/050824 filed on Apr. 13, 2012, which claims priority to British Patent Application No. 1106787.3, filed on Apr. 20, 2011. The contents of the above applications are incorporated herein by reference in their entirety.

The present invention relates to apparatus and methods involving the manipulation of a beam of electromagnetic radiation, such as a laser beam. More particularly, the invention relates to apparatus and methods for configuring an acousto-optic lens to cause a beam to be deflected in a desired way, for example by determining appropriate drive signals. In preferred embodiments, the beam is made to image a target space, such as by selectively focussing the beam in the target space, which may be a point, 1D line, 2D plane or a 3D volume.

The ability to steer and focus electromagnetic radiation, such as a laser beam, rapidly in three-dimensions is very attractive for several applications in biology, microfabrication and data storage.

Laser scanning confocal imaging is an important and widely used tool in biology because it allows high contrast visualization of subcellular structures and monitoring of physiological processes with fluorescence indicators within living or fixed tissue by excluding contaminating out-of focus light. Conventional confocal methods work best at relatively shallow depths where light penetration is good and scattering is minimal. Usually, conventional confocal imaging cannot be used to image biological activity deep (>100 μm) within the tissue. However, a type of laser scanning confocal microscopy has been developed that relies on non-linear multiphoton excitation to generate second or higher order harmonic light at shorter wavelength or selectively activate fluorophores where the light intensity exceeds the multiphoton threshold at the centre of the focal volume. Such fluorescent light is emitted in all directions by these fluorophores and is typically picked up by a high numerical aperture lens system and photomultipliers. As the focal spot is scanned through the tissue the light intensity emitted by the harmonic process or fluorophores varies according to non-linearity of the biological tissue or the intensity of staining by the fluorescence indicators in that part of the tissue, respectively. Combining the photomultiplier signal with the known position of the 2-photon focal volume enables a point, 1D, 2D or 3D image of the fluorescence intensity within the tissue to be reconstructed.

This technique, known as two-photon (or multiphoton) microscopy, allows imaging at much greater depth than confocal microscopy because of the longer excitation wavelengths used for multiphoton excitation (wavelengths of 700-1000 nm), which scatter less than those used in conventional confocal imaging, and because confocality arises intrinsically from the excitation volume allowing all emitted photons to be used to construct the image. These properties together with the low levels of photodamage achievable have made 2-photon imaging an extremely powerful method for examining physiological processes at the cellular and subcellular levels both in vitro and in vivo.

Two-photon imaging has been particularly popular in neuroscience, as it has allowed the dynamic properties of neuronal network activity to be imaged in intact brain tissue using calcium indicators. The spatial resolution of 2-photon microscopy is well suited to this task even allowing the small synaptic connections between neurons to be resolved. Multiphoton excitation has also begun to be used to photolyse "caged compounds" that release neurotransmitters, allowing synaptic inputs onto a cell to be mimicked. This technique is potentially very important for understanding synaptic integration and thus determining how individual neurons carry out low-level computations.

Other applications of light microscopy include imaging morphological structures and controlling neuronal activity with genetically encoded light activated proteins.

Many physiological processes of interest occur rapidly, on the 1-100 ms timescale, in small cellular structures within tissue that absorbs and scatters light. The deep tissue penetration and sub-micrometer resolution that 2-photon microscopy provides has made this approach popular for studying such biological phenomena. However, current 2-photon microscopes, which use galvanometer mirrors to steer the laser beam, and build up an image, are too slow to monitor many fast spatially distributed processes, which occur on the 1-100 ms time scale, since they typically take 100 ms to form an image. Moreover, most microscopes developed to date are optimized for imaging a single X-Y plane. Focussing in the Z direction is typically achieved by moving the apparatus relative to the sample (for example by moving the objective lens closer to, or further away from, the sample).

One promising approach suggested in the prior art to address some of these disadvantages is to use rapid acousto-optic deflectors (AODs) instead of galvanometers to steer the two-photon laser beam. AODs provide a fast, mass-less scanning solution that is not limited by inertia. The advantage of using AODs is that they allow the beam of radiation to be moved much more rapidly from point-to-point than in a galvanometer-based system (compare a movement time of 5-25 μs with AODs to 200-400 μs with galvanometers). This has several potential advantages. Firstly, images can be scanned rapidly. Secondly, multiple point measurements can be made with long dwell times at very high temporal resolution (e.g. using an AOD system with a 15 μs movement time, 33 points can be simultaneously sampled at a 1 KHz sample rate with a 15 μs dwell time or, in other words, 33 different points can be monitored 1000 times per second) This in known as random access multiphoton (RAMP) microscopy. The use of AODs therefore allows much more of the time to be devoted to actually collecting photons from the regions of interest rather than being taken up in moving the beam between sites.

As well as deflecting the beam in the X-Y plane, the use of two AODs per axis can, in principle, also be used to focus the laser beam in the Z-dimension. For example, Kaplan et al describe in "*Acousto-Optic Lens with Very Fast Focus Scanning*" Optics Letters, Vol. 26, No. 14, Jul. 15, 2001, pp 1078-1080, the use of two or four AODs to focus a laser beam in the X and Z plane or anywhere in an X-Y-Z volume. To achieve focussing in a 3D volume, two AODs for focussing in the X-Z plane are followed by two AODs for focussing in the Y-Z plane. These ideas are further developed in WO 2008/032061, where a compact configuration of AODs is first disclosed and the practical equations for driving these AODs are first given.

Several laboratories have developed scanners with two AODs to make fast 2-photon fluorescent measurements from neurons and for single photon photolysis in 2D. However, the disadvantage of this approach is that forming an image is complicated by chromatic and temporal dispersion and the fact that as the speed of scanning is increased the AOD introduces a focussing effect. The resulting astigmatism of the illumination point spread function (iPSF) can be corrected with lenses but only for a single scan speed, so microscopes using two AODs use point measurements to build up an image, which is slow and can take several seconds per image. Moreover, monitoring signals in 3D with 2 AODs is limited because the focus is inexorably linked to scan speed and dwell time.

There have been several recent advances in high speed 3D imaging. Sampling many locations (~100 neurons) within a 250 μm cube of cortex at 10 Hz has been achieved by combining fast piezoelectric control of the objective with sophisticated galvanometer based scanning [see W. Gobel, B. M. Kampa, and F. Helmchen, "*Imaging cellular network dynamics in three dimensions using fast 3D laser scanning*," Nat Methods 4, 73-79 (2007)]. Faster continuous focussing has been demonstrated using a piston mirror, and an ingenious dual objective system that corrects for spherical aberrations [see E. J. Botcherby, R. Juskaitis, M. J. Booth, and T. Wilson, "*Aberration-free optical refocusing in high numerical aperture microscopy*," Opt Lett 32, 2007-2009 (2007)]. The focusing properties of AODs have also been utilized for high speed focusing.

Kaplan et al. first demonstrated that 2 AODs with counter propagating chirped acoustic waves could be used to produce a high speed (400 kHz) cylindrical lens. They also proposed that four AODs could potentially be used to generate a spherical lens. These ideas have been developed further and a proof of principle 3D 2-photon microscope has been built that can focus rapidly and perform RAMP measurements [see G. Reddy, K. Kelleher, R. Fink, and P. Saggau, "*Three-dimensional random access multiphoton microscopy for functional imaging of neuronal activity*," Nat Neurosci 11, 713-720 (2008)]. However, a limitation of this system, which is based on 4 conventional AODs, was that light transmission efficiency drops off rapidly if the light is focused more than ±25 μm from the natural focal plane of the objective. Fast pointing was demonstrated within a 3D octahedral shaped field of view, by measuring calcium transients in neuronal processes, but the temporal dispersion of the laser pulses to the picosecond range, resulted poor 2-photon excitation efficiency. Moreover, imaging formation was slow (seconds) because it was limited to point measurements. This is problematic because RAMP measurements require a stack of high resolution images of the volume to be studied so that ROIs can be accurately selected. These and other technical difficulties have prevented AODs from being widely accepted as suitable deflectors for 2-photon microscopy up to now.

Many of these technical difficulties have been addressed by using a compact spherical acousto-optic lens (AOL) that can be used to scan and focus a femtosecond laser beam at high speed, as disclosed in WO2008/032061. The improvements in performance resulting from several of the innovations in this filing were reported in Paul A. Kirkby, K. M. Naga Srinivas Nadella, and R. Angus Silver, "*A compact acousto-optic lens for 2D and 3D femtosecond based 2-photon microscopy*," Opt. Express 18, 13720-13744 (2010). At the core of this AOL are four acousto-optic crystals with properties optimized for their function. By incorporating the AOL in a conventional 2-photon microscope a high speed 3D 2-photon microscope can be created that can image rapidly in raster-scan mode and perform RAMP measurements in 3D at 30 kHz.

A dynamic cylindrical lens formed of two AODs is illustrated in FIG. 8 of WO2008/032061. The acoustic transducer on each AOD crystal produces an ultrasonic sound wave that propagates across the optical aperture of the crystal. The sound wave induces changes in refractive index of the crystal, which diffracts the incoming laser beam at an angle determined by the frequency of the sound wave. By changing the sound frequency with time (chirping), the optical wave front can be curved bringing it to a line focus in the X-Z plane. A stationary focus requires two counter propagating AODs to cancel movement produced by the curtain of sound as it propagates across the crystal. Two AODs and associated objective optics (e.g. an objective lens) can thus be used to form a stationary cylindrical lens.

As shown in FIGS. 7 and 8 of WO2008/032061, increasing the negative chirp rate moves the resultant line focus up (increasing Z), whilst adjusting the difference between the ramp centre frequencies adjusts the X position. Changing to a positive chirp rate produces a diverging optical wavefront with a virtual focus above the AODs.

A second pair of counter propagating AODs orthogonal to the first can be used to focus in the Y-Z plane (see FIG. 10 of WO 2008/032061). These AODs are preferably interleaved with the first AODs and are accompanied by half-wave plates and polarisers, as disclosed in WO 2008/032061. The four AODs can shape the optical wavefront to give a spherically diverging or converging beam. This can be used to focus to a point above and below the natural focal plane of a subsequent fixed lens system.

The device of WO 2008/032061, although producing very promising results, suffers from some disadvantages.

The first disadvantage is that, when used in a continuous scanning mode, it has so far only been possible to perform scanning completely within a defined X-Y plane. Performing scanning where the continuous scanning has any component of movement in Z has thus far been impossible. This is due to the fact that the X- and Y-positions of the focal point are proportional to the absolute difference in drive frequencies applied to the AODs whereas the Z-position of the focus is proportional to the chirp rate of the AOD drive signals. Accordingly, it has been much easier to move a beam focal point within a given X-Y plane than it is to scan a beam focal point in Z.

For many applications, this is a significant disadvantage because the regions of interest rarely lie conveniently within a pure X-Y plane. For example, when scanning dendritic structures within brain tissue, it is desirable to scan along a pathway that is not a straight line and which is not oriented purely within an X-Y plane.

It would therefore be highly desirable to devise a method and apparatus for determining drive signals that allow a focal point to be scanned more arbitrarily in space, for example with a component in the Z-direction.

The second disadvantage is that the accuracy of the results has been limited by the quality of optical components used in the system. Various lenses (e.g. an objective lens at least) are typically used in a microscope and even the highest quality components will have some inherent aberrations compared to a perfect lens. The aberrations can be reduced by using only the highest quality components, but this makes the overall microscope more expensive. Further, even the highest quality objective lenses are optimised to focus light only to a completely flat X-Y plane. When used to rapidly focus light to different points within a 3D volume, commercially available objective lenses are not perfect, and serve to introduce aberrations that heretofore cannot be corrected.

It would therefore be highly desirable to devise a method and apparatus for determining drive signals that allow the inherent system aberrations to somehow be compensated for. This would allow better results to be achieved with the same components or, alternatively, similar or better quality results to be achieved with inferior (and cheaper) components.

The third disadvantage is that the accuracy of the results can further be limited by the non-homogenous nature of the object being scanned. Taking the example of imaging brain tissue, the tissue itself will not in general have a homogenous refractive index and the fact that imaging is taking place below the surface of the tissue means that the brain tissue intervening between the surface and the focal region serves to disperse the beam, increasing the point spread function (i.e. the size and shape of the focal point in all 3 dimensions, known as PSF) and lowering the quality of results.

It would therefore be highly desirable to devise a method and apparatus for determining drive signals that allow the tissue-induced aberrations to somehow be compensated for. This would allow better results to be achieved. In order to attempt to achieve this, the techniques known as adaptive optics have been developed for microscopy. Such methods are reviewed in *Adaptive Optics in Microscopy*, Martin J Booth, Phil. Trans. R. Society. A. 2007 365, 2829-2843. These techniques all use some additional apparatus such a deformable mirror or phase controlling spatial light modulator (e.g. based on liquid crystal optical phase modulators) to distort the wavefront of the microscope to partially compensate for the aberrations induced by the specimen. Unfortunately these techniques are all very slow compared to the agility of the AOLM and thus certainly not suitable for use with the AOLM in its pointing mode because the corrections required for each randomly accessed point in 3D can be expected to be different from one another.

The present invention addresses the above-mentioned problems and provides drive signals to the AOL itself that can address all three of the above problems at the same time and at high speed. Accordingly, the present invention represents a very significant step forward in the art.

In the device of WO 2008/032061, two types of drive signal are disclosed. The first type is a pure sinusoidal frequency. The frequency of the signals controls the position of the focal point in X and/or Y. The second type is a linear frequency chirp. Applying this type of drive signal allows the beam to be focused at Z-positions away from the natural focal plane of the objective lens. These two types of signal are sufficient to allow a spot to be focused at any point within a given 3D volume.

At its heart, the present invention is based around the realisation that the AOD drive signals can be regarded as phase-modulated functions. Further, the present inventors have found significant utility in representing the phase-modulation function as a Taylor series. As is well-known, a Taylor series can be used to represent any complicated function and is built up from a number of terms of increasing order. With each higher order term that is added, the approximation to the real-life function improves in accuracy. If the function is viewed as a graph, the zeroth order Taylor series term determines the zero-offset, the first order Taylor series term determines the gradient of the closest linear approximation and the second order Taylor series term adds in a parabola to further increase the accuracy of the approximation. The inventors have found that the Taylor series orders correspond to physical phenomena if the phase-modulation function is considered as a Taylor series function. The zeroth order term corresponds to a constant phase-modulation, which gives a notional drive signal of a fixed phase (constant amplitude) across the AOD aperture. This acoustic signal will only alter the phase of the Z propagating light beam but does not diffract or deflect it. The first order term corresponds to an unchanging drive frequency which is moving across the aperture at the speed of sound. A phase-modulation function having only a first order term therefore corresponds to the known constant frequency drive signal that can be used to deflect a beam in X or Y. The second order term corresponds to a ramped frequency modulation, which means the frequency of the drive signal changes linearly as a function of time. This leads to a chirped waveform for the drive signal. A phase-modulated function having a second order Taylor series term therefore corresponds to the known chirped frequency drive signal.

In the past, it was implicitly assumed that higher order terms (i.e. third order terms and greater) should not be introduced into the phase-modulation function. Friedman et al describe in *"Acousto-optic scanning system with very fast nonlinear scans"* Optics Letters, Vol. 25, No. 24, Dec. 15, 2000, pp 1762-1764 that a sinusoidal modulation introduces higher order terms that are seen as aberrations limiting the number of resolvable points (NRP). Until now, the thinking in the art has been that higher order phase-modulation, such as is inherently introduced by sinusoidal phase-modulation, is a cause of significant aberration in the system.

The inventors have surprisingly discovered that Taylor series terms of the third order and larger can be used not to create undesirable aberration, but to correct aberration that may arise elsewhere, for example in the optical system or the specimen being examined.

Further, the inventors have found that a pure third order term can be used to effect smooth scanning in Z, without creating any additional aberration at all.

In addition, a cyclic component of phase-modulation that involves a third or higher order term can be useful for more precisely locating structures of interest and speeding up the scanning of a sparse structure.

Thus, the invention in one aspect can be expressed as the use, in a method or apparatus, of a drive signal that is phase-modulated by a function that can be expressed as a Taylor series having one or more coefficients greater than second order.

An embodiment of the invention comprises an acousto-optic lens comprising a first acousto-optic deflector arranged to support a first acoustic wave; a second acousto-optic deflector arranged to support a counter-propagating second acoustic wave; a driver for synthesizing first and second drive signals for said respective first and second acousto-optic deflectors; wherein said driver is arranged to synthesize a first drive signal that is phase-modulated by a non-sinusoidal first function that can be expressed as a Taylor series having one or more coefficients greater than second order; and wherein said driver is arranged to synthesize a second drive signal that is phase-modulated by a non-sinusoidal second function that can be expressed as a Taylor series having one or more coefficients greater than second order.

The use of non-sinusoidal functions having components greater than second order allows arbitrary aberrations to be corrected, for example aberrations arising in the system optics or in the specimen under examination.

Optionally, at least one of said Taylor series coefficients greater than second order has a magnitude of at least $3.2/n!$ waves, where n is the order of the coefficient.

Providing the higher order coefficients to be larger than $3.2/n!$ waves allows non-negligable aberration correction to take place. Optionally, at least one of the Taylor series coefficients greater than second order has a magnitude of at least $3.5/n!$ waves, at least $4/n!$ waves, at least $5/n!$ waves or at least $6/n!$ waves.

An embodiment of the invention comprises an acousto-optic lens comprising: a first acousto-optic deflector arranged to support a first acoustic wave; a second acousto-optic deflector arranged to support a counter-propagating second acoustic wave; a driver for synthesizing first and second drive signals for said respective first and second acousto-optic deflectors; wherein said driver is arranged to synthesize a first drive signal that is phase-modulated by a first function that can be expressed as a Taylor series having one or more coefficients greater than second order, wherein at least one of said Taylor series coefficients greater than second order has a magnitude of at least 3.2/n! waves, where n is the order of the coefficient; and wherein said driver is arranged to synthesize a second drive signal that is phase-modulated by a second function that can be expressed as a Taylor series having one or more coefficients greater than second order, wherein at least one of said Taylor series coefficients greater than second order has a magnitude of at least 3.2/n! waves, where n is the order of the coefficient.

Providing the higher order coefficients to be larger than 3.2/n! waves allows non-negligible aberration correction to take place.

Cyclic phase-modulation can be used to allow the focal spot to be rapidly moved in a space around a mean position. This has several advantages including scanning for sparse objects and preventing light saturation or beaching.

Optionally, the first drive signal is such that said first acoustic wave alone would cause at least a hundredth of a wavelength of phase error in a beam of electromagnetic radiation passing through said first acousto-optic deflector.

This feature allows non-negligible aberrations to be compensated for.

In addition or instead, the second drive signal is such that said second acoustic wave alone would cause at least a hundredth of a wavelength of phase error in a beam of electromagnetic radiation passing through said second acousto-optic deflector.

Optionally, the first and/or second drive signals are such that the respective acoustic wave alone would cause a phase error in a beam of electromagnetic radiation passing through the respective acousto-optic deflector that has a magnitude of at least a twentieth of a wavelength, preferably at least a tenth of a wavelength, more preferably at least a fifth of a wavelength, more preferably still at least a half of a wavelength and even more preferably at least a wavelength.

Despite introducing phase errors into the beam of electromagnetic radiation, the first and second drive signals can optionally be arranged so that the phase errors introduced by each individually at least partially cancel one another out.

Optionally, a beam of electromagnetic radiation that has passed through said first and second acousto-optic deflectors and that has been brought to a focus by a subsequent lens has a phase error that is smaller than a wavelength, preferably smaller than half a wavelength, more preferably smaller than a quarter of a wavelength, more preferably still smaller than a fifth of a wavelength and even more preferably smaller than a tenth of a wavelength.

Optionally, said first drive signal is such that said first acoustic wave alone would cause at least a quarter of a wavelength of phase error in a beam of electromagnetic radiation passing through said first acousto-optic deflector and said second drive signal is such that said second acoustic wave alone would cause at least a quarter of a wavelength of phase error in a beam of electromagnetic radiation passing through said second acousto-optic deflector.

Conveniently, the first and second acoustic waves can be represented by respective wave functions in the form of a Taylor series as follows:

$$W_f^+(x,t) = A\exp\left(2\pi i\left(f(t-x/V_{ac}) + \sum_{n=0}^{n=N} P_{xt}(n)\left(\frac{t-x/V_{ac}}{\tau/2}\right)^n\right)\right)$$

$$W_f^-(x,t) = A\exp\left(2\pi i\left(f(t+x/V_{ac}) + \sum_{n=0}^{n=N} P_{xt}(n)\left(\frac{t+x/V_{ac}}{\tau/2}\right)^n\right)\right)$$

where
x=lateral distance coordinate measured from centre of AOD
t=time measured from centre of wave function
$V_{ac}$=speed of sound wave in crystal
f=reference centre frequency of AOD drive
$W_f^+(x,t)(W_f^-(x,t))$=wave function propagating towards+x(−x)
A=amplitude of wave function
$P_{xt}(n)$=Coefficient n of Taylor series
units are waves (of aberration) measured at $t-x/V_{ac}=\tau/2$
N=highest order of aberration considered
L=length of AOD
$\tau=L/V_{ac}$=AOD fill time
N≥3

In accordance with a preferred aspect of the invention, the drive signals are phase or frequency modulated so as to partially or substantially correct aberrations arising in an associated optical system.

The drive signals may alternatively or additionally be phase or frequency modulated so as to partially or substantially correct aberrations arising in a specimen sample being examined.

When the acousto-optic lens is oriented substantially in an X-Y plane such that electromagnetic radiation impinges upon it travelling in the −Z direction, said first and second acoustic waves optionally diffract said electromagnetic radiation so that, subsequent to an objective lens, it would form a focused point that smoothly travels with at least a component in the −Z or Z direction.

This allows truly arbitrary scanning in a 3D volume to be achieved for the first time in an AOD system.

Optionally, the driver is arranged to synthesize drive signals such that an incoming beam of electromagnetic radiation will be focused by a subsequent lens to a point spread function that smoothly moves with a component in the Z-direction and which has a maximum peak intensity that is unchanging to within acceptable limits say 20% as said point spread function moves in the Z-direction during a mini-scan.

The system is able to smoothly move the focal position in Z with low amounts of aberration such that the intensity remains within acceptable limits, say within 50% of its peak. Preferably, the intensity remains within 40% of its peak, more preferably 30%, more preferably still 20% and even more preferably 10%.

Additionally or alternatively, the driver is arranged to synthesize drive signals such that an incoming beam of electromagnetic radiation will be focused by a subsequent lens to a point spread function that moves with a component in the Z-direction and which has a FWHM width that is unchanging to within acceptable limits, say 50% as said point spread function moves in the Z-direction during a mini-scan. Preferably, the FWHM width remains unchanging to within 40%, more preferably 30%, more preferably still 20% and even more preferably 10%.

The system is able to smoothly move the focal position in Z with low amounts of aberration such that the width of the PSF remains constant to within 40%.

Optionally, the driver is arranged to synthesize drive signals that are phase-modulated to the third order but with substantially no components greater than third order.

This allows pure Z-scanning to be achieved and also allows Z scanning in combination with X and Y movement to be achieved.

Optionally, the driver is arranged to additionally add in components greater than third order that serve to correct aberrations arising in an associated optical system or in a specimen under examination.

This allows aberrations, whether arising in the system or in the sample being examined, to be corrected at the same time as scanning with a Z component.

Optionally, the driver is arranged to synthesize drive signals that, in addition to linear frequency-modulated components, also contain a cyclic component of phase or frequency modulation, so that a beam of electromagnetic radiation travelling through said acousto-optic lens, when focused by a subsequent lens, forms a focal point that has a cyclic movement centred on a mean focus position defined by the linear frequency-modulated components.

This allows the system to automatically scan along sparse objects and/or to track objects as they move in 3D space Optionally, the linear frequency-modulated components are controlled by a feedback algorithm using information from the cyclic movement to determine the position of points or features of interest in a 3D space.

The apparatus is optionally configured to iteratively deduce the drive signals to use that correct aberrations, whether in the system or from the sample.

This reduces the amount of work needed to configure the apparatus and also provides for more accurate aberration correction.

The iteration can involve the driver being for synthesizing a first drive signal that contains a first known aberration of third order or higher, and determining if this has improved the image or not. The third or higher order aberration supplied can then be iteratively adjusted to optimise the aberration correction.

The apparatus optionally includes a memory for storing drive parameters associated with respective focal positions in space, wherein said acousto-optic lens is arranged to use said stored drive parameters when it is intended to focus electromagnetic radiation at an associated respective position in space.

This allows the system to practically achieve the dynamic aberration correction where the aberration is found to be a function of focal position (as when the aberration originates from the sample being examined).

The drive parameters are optionally the coefficients of a series expansion of the wave functions representing the phase or frequency modulation of the respective first and second acoustic waves.

This provides a simple method for storing the drive parameters that allows the necessary drive signals to be readily determined and supplied.

Optionally, the first and second acousto-optic deflectors are provided by a single crystal such that the respective first and second acoustic waves propagate in the same crystal.

This is an alternative construction for the system.

The acousto-optic lens may comprise a third acousto-optic deflector and a fourth acousto-optic deflector; wherein said third and fourth acousto-optic deflectors are for deflecting said beam of electromagnetic radiation in a direction having a component perpendicular to the direction in which said first and second acousto-optic deflectors deflect said beam of electromagnetic radiation; said driver being for synthesizing third and fourth drive signals for said respective third and fourth acousto-optic deflectors; wherein said driver is arranged to synthesize a third drive signal that is phase-modulated by a third function that can be expressed as a Taylor series having one or more coefficients greater than second order, and wherein said driver is arranged to synthesize a fourth drive signal that is phase-modulated by a fourth function that can be expressed as a Taylor series having one or more coefficients greater than second order.

The use of four deflectors allows a fully 3D system to be implemented. Again, there is no requirement for four separate AOD crystals (although this is preferred) and any of the drive signals can be for driving the same crystal.

The driver is optionally arranged according to one or more of the following:

(a) said third and fourth functions are non-sinusoidal;

(b) said third and fourth functions include a coefficient greater than second order having a magnitude of at least $3.2/n!$ waves, where n is the order of the coefficient;

(c) said drive signals are phase or frequency modulated so as to partially or substantially correct aberrations arising in an associated optical system;

(d) said drive signals are phase or frequency modulated so as to partially or substantially correct aberrations arising in a specimen sample being examined;

(e) said drive signals are such as to provide, subsequent to an objective lens, a focused point that smoothly travels with at least a component in the −Z or Z direction.

The invention also includes a microscope comprising the acousto-optic lens and objective optics. The microscope may optionally also include a laser source and/or a detector. The objective optics preferably comprise a microscope objective lens.

The invention also includes a method for determining drive signals of an acousto-optic lens for use in deflecting a beam of electromagnetic radiation with said acousto-optic lens, the method comprising determining a first drive signal that is phase-modulated by a non-sinusoidal first function that can be expressed as a Taylor series having one or more coefficients greater than second order and determining a second drive signal that is phase-modulated by a non-sinusoidal second function that can be expressed as a Taylor series having one or more coefficients greater than second order.

The invention also includes a method for determining drive signals of an acousto-optic lens for use in deflecting a beam of electromagnetic radiation with said acousto-optic lens, said method comprising determining a first drive signal that is phase-modulated by a first function that can be expressed as a Taylor series having one or more coefficients greater than second order, wherein at least one of said Taylor series coefficients greater than second order has a magnitude of at least $3.2/n!$ waves, where n is the order of the coefficient and determining a second drive signal that is phase-modulated by a second function that can be expressed as a Taylor series having one or more coefficients greater than second order, wherein at least one of said Taylor series coefficients greater than second order has a magnitude of at least $3.2/n!$ waves, where n is the order of the coefficient.

Preferably, said first and second drive signals are for causing respective first and second acoustic waves to be propagated in an acousto-optic lens.

Optionally, the first and second acoustic waves can be represented by respective wave functions in the form of a Taylor series as follows:

$$W_f^+(x, t) = A\exp\left(2\pi i\left(f(t - x/V_{ac}) + \sum_{n=0}^{n=N} P_{xt}(n)\left(\frac{t - x/V_{ac}}{\tau/2}\right)^n\right)\right)$$

$$W_f^-(x, t) = A\exp\left(2\pi i\left(f(t + x/V_{ac}) + \sum_{n=0}^{n=N} P_{xt}(n)\left(\frac{t + x/V_{ac}}{\tau/2}\right)^n\right)\right)$$

where
x=lateral distance coordinate measured from centre of AOD
t=time measured from centre of wave function
$V_{ac}$=speed of sound wave in crystal
f=reference centre frequency of AOD drive
$W_f^+(x,t)(W_f^-(x,t))$=wave function propagating towards+ x(−x)
A=amplitude of wave function
$P_{xt}(n)$=Coefficient n of Taylor series
units are waves (of aberration) measured at $t−x/V_{ac}=\tau/2$
N=highest order of aberration considered
L=length of AOD
$\tau=L/V_{ac}$=AOD fill time
$N\geq 3$ The determining optionally comprises modulating said drive signals so as to partially or substantially correct aberrations arising in an associated optical system.

The determining can optionally additionally or alternatively comprise modulating said drive signals so as to partially or substantially correct aberrations arising in a specimen sample being examined.

Optionally, the first and second drive signals are for causing respective first and second acoustic waves to be propagated in said acousto-optic lens, said method further comprising: impinging electromagnetic radiation upon said acousto-optic lens, wherein said electromagnetic radiation is travelling in the −Z direction; using said first and second acoustic waves to diffract said electromagnetic radiation; and using objective optics to focus said diffracted electromagnetic radiation so that it forms a focused point that travels with at least a component in the −Z or Z direction.

The determining optionally comprises determining drive signals that, in addition to linear frequency-modulated components, also contain a cyclic component of phase or frequency modulation so as cause a cyclic movement of a focus position of the electromagnetic radiation travelling through the acousto-optic lens, centred on a mean focus position defined by the linear frequency-modulated components.

The method may further comprise using information from said cyclic movement in a feedback algorithm to determine the position of points or features of interest in a 3D space.

The method may further comprise storing drive parameters associated with respective focal positions in space; and using said stored drive parameters to focus electromagnetic radiation at an associated respective position in space.

Optionally, the drive parameters are the coefficients of a series expansion of the wave functions representing the modulation of the respective first and second drive signals.

The method may further comprise providing said first and second drive signals to respective first and second acousto-optic deflectors so as to cause respective first and second acoustic waves to propagate in said first and second acousto-optic deflectors for focusing an incoming beam of electromagnetic radiation.

Optionally, the first and second acousto-optic deflectors are provided by a single crystal such that the respective first and second acoustic waves propagate in the same crystal.

The method may further comprise determining third and fourth drive signals that will, when provided to the acousto-optic lens in addition to the first and second drive signals, cause an incoming beam of electromagnetic radiation to be focussed by objective optics in three dimensions during a time period; wherein said third drive signal is phase-modulated by a third function that can be expressed as a Taylor series having one or more coefficients greater than second order; wherein said fourth drive signal is phase-modulated by a fourth function that can be expressed as a Taylor series having one or more coefficients greater than second order.

The invention also includes a method for deflecting a beam of electromagnetic radiation using an acousto-optic lens, said method comprising determining first and second drive signals as discussed above, applying said first drive signal so as to cause a first acoustic wave to propagate in a first acousto-optic crystal; applying said second drive signal so as to cause a second acoustic wave to propagate in a second acousto-optic crystal; passing an incoming beam of electromagnetic radiation through said acousto-optic lens so as to deflect it.

The invention also includes a driving apparatus for an acousto-optic lens, said driving apparatus comprising: a first drive signal synthesizer for synthesizing a first drive signal that is phase-modulated to the third order but with substantially no components greater than the third order; a second drive signal synthesizer for synthesizing a second drive signal that is phase-modulated to the third order but with substantially no components greater than the third order.

Optionally, said first and second drive signals are synthesized so that a beam of electromagnetic radiation impinging on said acousto-optic lens will be focussed by subsequent optics in at least one dimension.

Optionally, said first and second drive signal synthesizers are arranged to additionally add in components greater than third order that serve to correct aberrations arising in an optical system.

The invention also includes an acousto-optic lens comprising: an acousto-optic deflector; a driver for providing a drive signal to said acousto-optic deflector so as to cause an acoustic wave to propagate in said acousto-optic deflector; wherein said driver is arranged to provide a drive signal that is phase-modulated to an order greater than second order.

Optionally, one or more of the following apply:

(a) said drive signal is phase-modulated by a function that is non-sinusoidal;

(b) said drive signal is phase-modulated by a function that can be expressed as a Taylor series having one or more coefficients greater than second order and that includes a coefficient greater than second order having a magnitude of at least 3.2/n! waves, where n is the order of the coefficient;

(c) said drive signal is phase or frequency modulated so as to partially or substantially correct aberrations arising in an associated optical system;

(d) said drive signal is phase or frequency modulated so as to partially or substantially correct aberrations arising in a specimen sample being examined;

(e) said drive signal is such that a beam of electromagnetic radiation traveling through said acousto-optic lens will be focused by subsequent optics to a point spread function that moves with a component in the Z-direction and which has a maximum peak intensity that is unchanging to within acceptable limits say 20% as said point spread function moves in the Z-direction;

(f) said drive signal is such that a beam of electromagnetic radiation traveling through said acousto-optic lens will be focused to a point spread function that moves with a component in the Z-direction and which has a FWHM width that is unchanging to within say 40% as said point spread function moves in the Z-direction.

The invention also includes a driving apparatus for an acousto-optic lens, said driving apparatus being arranged to provide at least one drive signal that is phase-modulated to an order greater than second order.

The invention also includes an acousto-optic lens comprising: an acousto-optic deflector; a driver for providing a drive signal to said acousto-optic deflector so as to cause an acoustic wave to propagate in said acousto-optic deflector; wherein said driver is arranged to provide a drive signal that is phase-modulated to an order greater than second order.

The invention also includes a method for determining drive signals of an acousto-optic lens for use in deflecting a beam of electromagnetic radiation with said acousto-optic lens, said method comprising determining first and second drive signals that will, when provided to the acousto-optic lens, cause an incoming beam of electromagnetic radiation to be focussed by subsequent optics in at least one dimension, wherein said drive signals are phase-modulated to an order greater than second order.

The invention further includes a microscope system comprising: a controller apparatus; said acousto-optic lens; microscope optics; and a laser for supplying said beam of electromagnetic radiation.

The controller apparatus can be any of the apparatus as described above and herein.

The driver may be part of the controller or separate therefrom.

The controller may comprise a phase sensitive detector and/or a time sensitive detector.

The controller may comprise an aberration generator and a means for superimposing generated aberrations onto standard driving signals.

The controller may comprise means for determining if a detected image has been improved by a generated aberration.

The controller may comprise means for generating an updated aberration based on the output of the means for determining if a detected image has been improved.

The controller may include a frequency generator for generating cyclic frequencies for superimposing over one, some or all of the drive signals.

The controller may comprise means for computing a position where light is being focused.

The present invention will now be further described, by way of non-limitative example only, with reference to the accompanying schematic drawings, in which.

The present invention is an improvement to the apparatus and methods described in WO 2008/032061 and may be implemented together with any of the measures discussed in WO 2008/032061, including but not limited to the compact configuration of AODs (including optional half wave plates and polarisers), the means for chromatic aberration correction and the different upstream and downstream AOD structures (including the TeO$_2$ crystals). The entire disclosure of WO 2008/032061 is hereby incorporated by reference.

Although the invention will be described with reference to the compact AOD configuration and its corresponding drive equations, the invention is equally applicable to other AOD configurations, such as configurations where telecentric relays are used to connect the AODs together. The general equations for driving such telecentrically connected configurations are simpler than for the compact configuration and are known to those skilled in the art.

The invention may be practised to manipulate any beam of electromagnetic radiation, but is preferably practised on a coherent beam such as a laser beam. As in WO 2008/032061, typical laser wavelengths of 700-1000 nm are used, but this does not limit the present invention. The centre frequency of the laser may lie in the range 400 to 1200 nm, preferably 700 to 1000 nm, more preferably being approximately 850 nm. The laser is typically pulsed, with the pulses having a length of 2 µs or less, preferably 500 fs or less, more preferably 100 fs or less.

Figure 1:
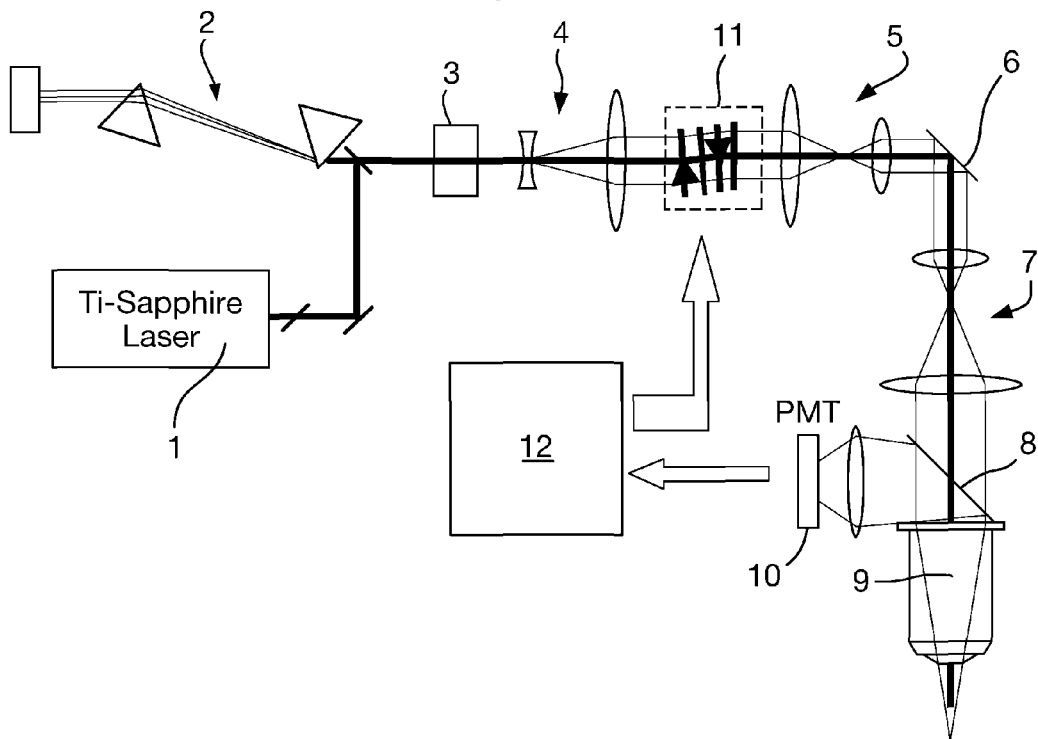
FIG. 1 shows the main components of a microscopy system according to the present invention.

FIG. 1 shows a schematic diagram of the complete apparatus that can be used to perform microscopy, preferably 2-photon microscopy. The present invention is concerned in particular with the drive signals for driving the two or four AODs of an AOL to give improved results in terms of image quality. The invention preferably comprises a computer control system 12 that drives the AOL 11 based on the equations appropriate to the configuration of AODs.

With the exception of the prechirper 2, the other components of the complete 2-photon microscope shown in FIG. 1 are generally similar to those of a standard 2-photon microscope although the controller 12 which includes the drive electronics for the AODs and the image reconstruction software is somewhat more complex than the standard equivalent.

The laser 1 is preferably a Ti-sapphire laser but any laser may be used according to the experiments to be carried out.

The laser preferably emits radiation in very narrow pulses, for example of the order of 100 fs, as disclosed in WO 2008/032061.

The prechirper 2 is preferably included to compensate for the effect of the high chromatic dispersion of $TeO_2$ which otherwise spreads out the laser pulses in time and greatly reduces 2-photon emission efficiency (Reddy, Kelleher et al. 2008).

A pockels cell 3 is optionally used to provide control over the laser intensity and a beam expander 4 may be used to expand the beam diameter prior to passing through the AOL 11. Although four AODs are shown in the AOL of FIG. 1, only two may be used if deflection in only one direction (e.g. the X direction) is desired.

The beam of electromagnetic radiation may exit the AOL through a relay 5 and is optionally deflected by fixed or galvanometer mirrors 6, whereafter it may pass through another relay 7 (comprising a field lens and a tube lens in this example) before reaching the microscope objective optics 9.

The objective optics 9 typically comprises an objective lens and is used to finally focus the beam to the desired location. Any reflected or scattered light preferably passes back up through the objective lens and is routed by optional dichroic mirror 8 to the sensor 10, here in the form of a photomultiplier.

The data acquisition from the sensor 10 is typically precisely synchronised with the drive to the AODs so that for each data gathering timeslot (typically 1-12 µs long) the controller 12 is able to insert into its memory the measured light intensity at the 3D coordinates of the voxel that the AOL is pointing to during that time.

Figure 2:
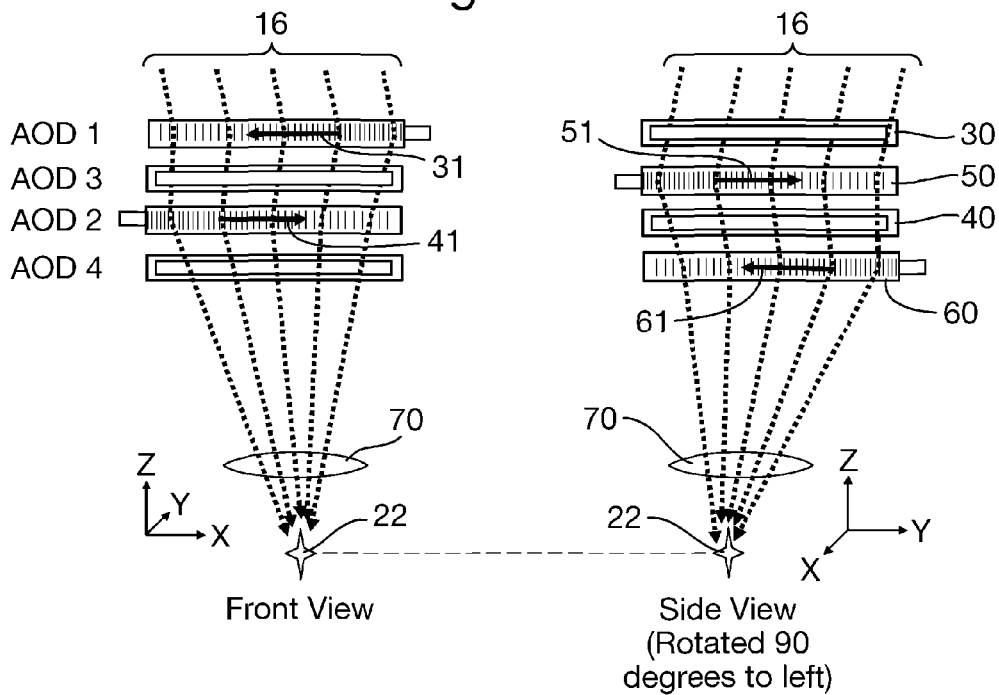
FIG. 2 shows two orthogonal views of a four AOD compact configuration preferably used in conjunction with the present invention.

FIG. 2 shows the sequence and orientation of four AODs forming an AOL. The first AOD 30 is driven by a first drive signal to propagate a first acoustic wave 31 through the aperture of the first AOD 30. The second AOD 40 is driven by a second drive signal to propagate a second acoustic wave 41 through the aperture of the second AOD 40. The drive signals typically cause acoustic waves of the same frequency as the drive signal to be applied to the AOD aperture. When third and fourth AODs are present (as in FIGS. 1 and 2), the third drive signal creates the third acoustic wave 51 and the fourth drive signal creates the fifth acoustic wave 61 in the same way. The first AOD 30 works together with the second AOD 40 to provide deflection in the X direction (i.e. in the X-Z plane) whereas the third and fourth AODs are for providing deflection in the Y direction (i.e. the Y-Z plane). The first and second AODs are preferably arranged so that the acoustic waves 31, 41 in each travel in opposite directions (shown by arrows in FIG. 2). In general though, the first acoustic wave can be made so as to have only a resolved component that travels counter to a resolved component of the second acoustic wave. In practice, this means the first and second AODs 30, 40 can be in any orientation with respect to one another except for the orientation where the acoustic waves 31, 41 travel in precisely the same direction as one another. The acoustic waves are then said to be "counter-propagating" because they have at least components that are counter-propagating with respect to one another. Preferably though, the first and second AODs are oriented with 180 degrees of relative rotation in the X-Y plane such that the first and second acoustic waves are oppositely propagating in a pure sense.

The third AOD 50 works together with the fourth AOD 60 to provide deflection in the Y direction. The third and fourth AODs 50, 60 are preferably arranged so that the acoustic wave in each 51, 61 travels in an opposite direction. As discussed above with regard to the first and second AODs, any component of counter-propagation is sufficient. Also, the acoustic waves 51, 61 in the third and fourth AODs are each preferably perpendicular to the acoustic waves 31, 41 in the first and second AODs. Again, though pure perpendicularity is not required and any components of the third and fourth waves 51, 61 that are perpendicular to the resolved components of the first and second waves 31, 41 that are counter propagating will suffice. In the preferred embodiment, as shown in FIG. 2, if the first AOD 30 is said to have a direction of propagation of the first acoustic wave 31 in a northerly direction, the second acoustic wave 41 goes in the southerly direction, the third acoustic wave 51 goes in the easterly direction and the fourth acoustic wave 61 goes in the westerly direction. The third and fourth waves can easily be switched so that the third wave 51 goes west and the fourth wave 61 goes east and this requires only a minor adjustment to the respective drive signals.

In the compact configuration shown, the AODs of the AOL are in the order (from upstream to downstream in terms of the beam direction) first, third, second, fourth. As discussed in WO 2008/032061, this is a beneficial construction in terms of matching the polarisation of light between the AODs with minimal correction/filtering required by way of half-wave plates and/or polarisers. FIGS. 1, 2, 3, 9, 10, 12, 15 and 16 omit the half-wave plates and polarisers for clarity but such are explained in more detail in WO 2008/032061. Other configurations of AODs can be used in the AOL and the invention is not restricted to the order shown in the preferred embodiment.

The present invention may equally be applied to a system having only two AODs, for example a system having only a first AOD 30 and second AOD 40 to provide deflection in the X-Z plane only. Such a configuration would have a first AOD 30 followed by a second AOD 40, with an optional half-wave plate to match the diffracted output polarisation of the first AOD 30 to the required input polarisation of the second AOD 40, and an optional polariser to suppress the non-diffracted light from the first AOD 30. Of course such a system can only deflect within the X-Z plane and, if astigmatism is to be avoided, should focus on the same Z plane that the YZ plane is focussed upon.

As disclosed in WO 2008/032061, the actual distances between the AODs and the optical thickness of any intervening components, as well as the AODs themselves, needs to be taken into account when determining the precise form of the drive signals. If further optical components are interposed between the AODs, such as half wave plates and polarisers, then the apparent optical separation can be calculated by taking into account the refractive index of such additional components. Also, the refractive index of the AODs themselves is taken into account. The details of how the drive signals should be configured to take account of the optical components is readily available to the skilled person from WO 2008/032061.

In theory the compact configuration of AOL can be used to achieve a stationary focal point at any chosen value of Z within the field of view. When such stationary focal points are created, the microscope is said to be working in the "pointing mode".

To build up a three-dimensional image of a semi transparent sample (such as brain tissue), it is useful to be able to follow a raster scan with the focal point along a predetermined path through the sample. The most commonly used raster scan is to move the focal point in the X direction, keeping the Y and Z values constant, to then increment the Y position by some small amount, to perform another scan in the X direction and so on until a two-dimensional grid of scans is achieved. The Z direction is then incremented and another two-dimensional grid is scanned until a three dimensional volume has been built up. This type of raster scanning is much faster than building up an image by using the pointing mode to sequentially address every point. The pointing mode takes one AOD fill time plus one data collection time (dwell time) to take data from each point. With 25 µs AOD fill time and a typical 4 µs dwell time this process takes nearly 4 minutes in the pointing mode for the 7.8 million voxels that the target system is capable of resolving. With raster scanning many data points are gathered for each AOD fill time by moving the focused spot over sequential voxels at a rate of 1 dwell time per voxel. As the raster scans increase in length so the total scan time reduces asymptotically towards the limit of one dwell time per voxel which is about 30 seconds for 4 µs dwell time scanning the full 3D volume. Equations for such raster scanning were derived in WO 2008/032061 and reference is made to those.

As well as being applicable to the pointing mode (where light is focused to a stationary point), the present invention is also applicable to the scanning mode (where the focal point is constantly moving). In the past, such scans have involved scanning in an X-Y plane and incrementing Z to build up a 3D picture and the aberration correction aspects of the present invention can be used for such scans. Additionally, the invention allows the creation of a wholly new type of scan where the focal point can be made to move smoothly with a component in the Z or −Z direction.

One limit to providing an "always-on" constant scanning spot is that frequency chirps are needed to move the focal point out of the natural Z plane. The fact that the AODs have a limited operating frequency range and the frequency ramp rates for Z focusing are high, means that it is often necessary to reset the drive frequencies to the other side of the operating frequency range. How to do this to achieve "mini-scans" is disclosed in WO 2008/032061. Further, a method for optimising the drive frequencies so as to extend the length or quality of the mini-scans is disclosed in British patent application number 1006679.3 filed 21 Apr. 2010, incorporated herein by reference. The optimised drive frequencies disclosed there and the methods of mini-scanning may be used in conjunction with the present invention.

The AOL of WO 2008/032061 includes acousto-optic deflectors that are provided with drive signals of one of the following two types:
- constant frequency signals. At Z=0, the frequencies, or more precisely the difference between the frequencies in the two AODs for each dimension (X-Z or Y-Z), are adjusted to control the X and Y positions of the focal point;
- linear ramped frequency signals. The ramp rate (also known as chirp rate) determines the Z position of the focus.

Figure 7:
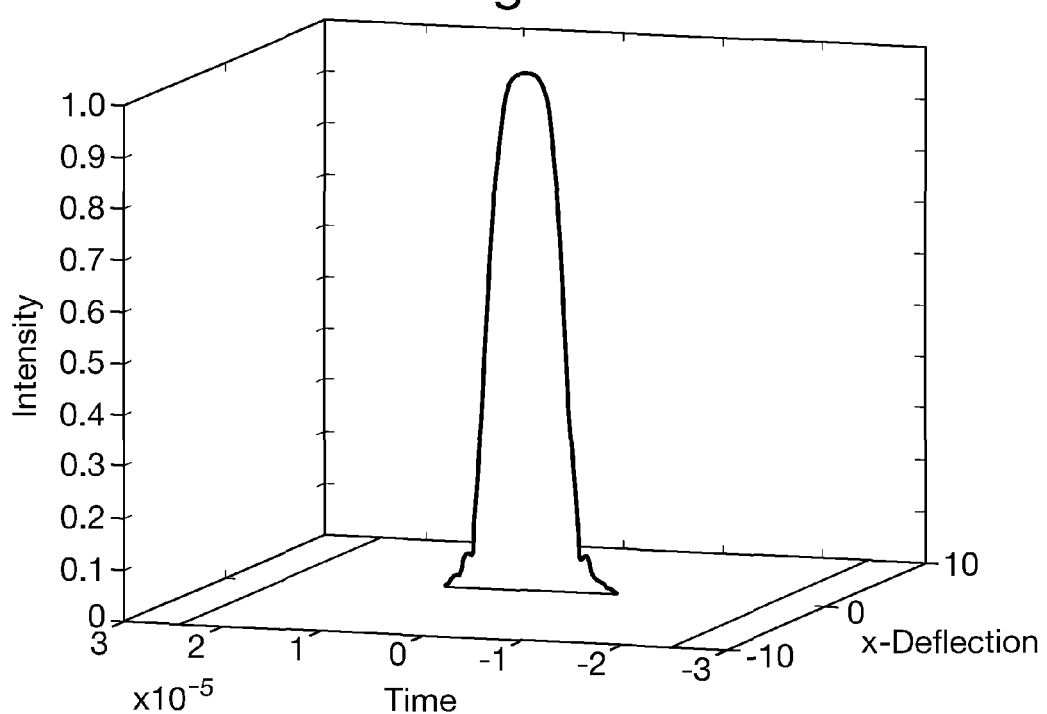
FIG. 7 is a graph similar to FIG. 4 but showing the 2-photon intensity and how it varies with time as a fourth order aberration of half the magnitude of FIG. 4 is corrected.

Providing a linear frequency ramp is equivalent to linear frequency modulation (FM) of the drive signals, and, because frequency is the differential of phase, is equivalent to parabolic (second order) phase-modulation. It hence generates parabolic phase fronts across the AOL output aperture. Referring to FIG. 7 of WO 2008/032061, FIG. 7a shows a parabolic wave front ultimately converging at a focal point having a positive value of Z, FIG. 7b shows a linear wave front ultimately converging at a focal point at Z=0 and FIG. 7c shows a parabolic wave front ultimately converging at a focal point having a negative value of Z. In each of these cases, the lens 70 focuses the beam to a maximal intensity perfectly diffraction-limited point spread function at the system focus lying within in the 3D field of view.

Non-linear frequency modulation (i.e. third or higher order phase-modulation) of the drive signals was previously thought to be a source of aberration error and was considered undesirable (see Friedman et al referred to above). In general, non-linear frequency modulation was known to cause a non-parabolic wavefront, making focusing to a perfect diffraction-limited spot impossible using conventional objective optics. The non-linear frequency modulation caused the PSF to lose peak intensity and become more spread out in space (as measured by a full-width, half-maximum (FWHM) method). However, the present inventors have surprisingly found that such non-linear frequency modulation can be harnessed to provide beneficial effects.

Zernike modes are normally referred to for defining "aberrations" of circularly symmetric optical systems where phase is defined as a third dimension across the 2 (XY) dimensions of a circular aperture. Here, "aberration" refers to the phase error that exists at each spatial position with respect to a reference surface that is taken here to be a flat surface parallel to the XY plane. The phase error that exists in a beam that has been focused to a point will in general be equivalent to the product of the phase errors from the two orthogonal pairs of AODs (i.e. the product of errors originating from the first to fourth AODs). The following explanations are in terms of the errors (aberrations) from one pair of AODs alone which is capable of deflection and focusing in the X-Z plane. The equations for the Y-Z AODs are exactly the same.

Figure 3:
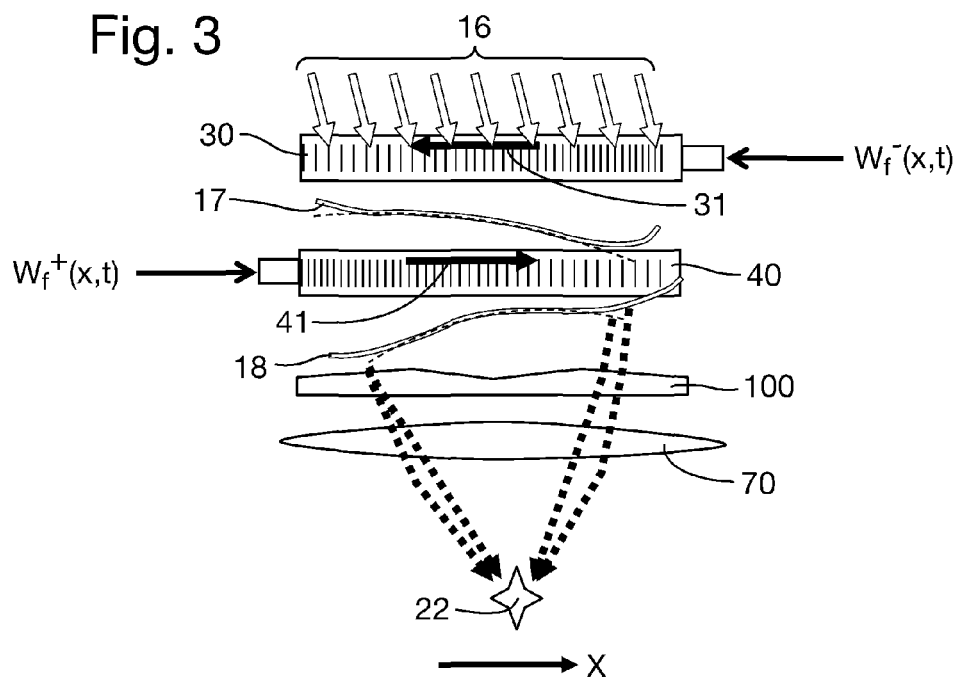
FIG. 3 shows two AODs and a modelled system-induced aberration.

Referring to FIG. 3, the counter-propagating traveling waves 31, 41 in each AOD can be described as wave functions $W^+_f(x,t)$ and $W^-_f(x,t)$ traveling in the plus and minus X directions respectively. These waves are complex representations of the phase-modulation that a −Z direction traveling light wave would experience as it propagated through the acoustic wave 31 or 41 in the crystal. The wave functions can be mathematically represented as follows:

$$W^+_f(x,t) = A\exp\left(2\pi i\left(f(t-x/V_{ac}) + \sum_{n=0}^{n=N} P_{xt}(n)\left(\frac{t-x/V_{ac}}{\tau/2}\right)^n\right)\right)$$

$$W^-_f(x,t) = A\exp\left(2\pi i\left(f(t+x/V_{ac}) + \sum_{n=0}^{n=N} P_{xt}(n)\left(\frac{t+x/V_{ac}}{\tau/2}\right)^n\right)\right)$$

where
x=lateral distance coordinate measured from centre of AOD
t=time measured from centre of wave function
$V_{ac}$=speed of sound wave in crystal
f=reference centre frequency of AOD drive
$W^+_f(x,t)(W^-_f(x,t))$=wave function propagating towards+x(−x)
A=amplitude of wave function
$P_{xt}(n)$=Coefficient n of Taylor series
units are waves (of aberration) measured at $t-x/V_{ac}=\tau/2$
N=highest order of aberration considered
L=length of AOD
$\tau L/V_{ac}$=AOD fill time
N≥3

The first term in the inner brackets is the normal expression for a traveling acoustic sine wave that is traveling in the X direction at a velocity $V_{ac}$. The second term represents the sum of a series of aberrations of order n=0:N representing a Taylor series. The different orders of the Taylor series represent different orders of aberration (phase error) that will be introduced by the acoustic wave to the light beam. The orders can be numbered 0, 1, 2, 3 etc and have been found to represent physical phenomena as follows: 0=phase displacement, 1=tilting of the light wave, 2=focus or defocus of the light wave, 3=cubic aberration related to coma of the light wave in the radially symmetric case, 4=$4^{th}$ order cylindrical aberration (analogous to spherical aberration of the light wave). In the equations above, the highest order considered is N. Note that although a Taylor series is used above, any alternative basis function could be used to represent the aberrations. For example the aberration could be represented as the sum of a Fourier series rather than a Taylor series.

In some text books and papers the term "aberration" refers only to aberrations with respect to a best fitting spherical wavefront, and in such cases the zeroth, first and second order terms of the Taylor series used here are not referred to as "aberrations", just descriptions of how the wavefront is deflected and focusing. This is just alternative nomenclature and is not of mathematical or physical significance. We have chosen to refer to all terms in the Taylor series as "aberrations" since they all need to be referenced back to the AOD grating surface which is planar. The first term in brackets in the above equation (the travelling sine wave at the centre reference frequency of the AOD) is of course a first order tilt term which diffracts the laser beam through a fixed angle. This has been separated out from the rest of the aberration series simply because it is usually cancelled out by the same term in the opposite travelling wave in the second AOD.

FIG. 3 shows how a fixed aberration inherent in the system can be modeled as a lens 100 of arbitrary shape. This aberration can be expressed mathematically in terms of a similar complex exponential representation of the phase aberration induced. Here the expression is simpler than for the AODs because the aberration is purely a function of x, not x and t as for a traveling wave:

$$W_f(x, t) = \exp\left(2\pi i \left(\sum_{n=0}^{n=N} P_x(n)\left(\frac{2x}{L}\right)^n\right)\right)$$

where
$W_f(x)$=wavefront operator
$P_x(n)$=Coefficient n of Taylor series
units waves (at x=L/2)
N=highest order of aberration considered As shown in FIG. 3, the initial impinging electromagnetic radiation 16 encounters the first AOD 30 first. The AOD of the present invention is driven by a drive signal having higher order (n≥3) terms and so the electromagnetic radiation can be diffracted by the first traveling acoustic wave 31 to have an arbitrary wavefront 17. This then passes through the second AOD 40 where it is diffracted by the second acoustic wave 41 to have the wavefront 18. The light in FIG. 3 also propagates through an optical system, (such as that shown in FIG. 1 comprising the beam expander 4, relays 5, 7 and objective optics 9), which is represented here by equivalent lens 100. After propagating in the −Z direction through all three of these phase-modulation components the light wave can be computed as the original planar wavefront light wave modulated by the three sets of aberrations:

$$E(x,t)=E_0 \times W_f^+(x,t) \times W_f^-(x,t) \times W_f(x)$$

This expression represents the electric field of the optical wave just in front of the focusing lens 70. As is well known, the effect of a lens is to project an image that is proportional to the Fourier Transform of the electric field distribution of the optical wave propagating through it, acting effectively as a spatial spectrum analyser for the x signal represented by the modulation superimposed on the optical beam. Since this signal is varying with time as the counter-propagating waves pass each other, this spectrum is also a function of time. The 2-photon intensity of the optical wave as a function of position X beneath the lens can then be computed as the product of the complex field with its complex conjugate and squared again to model the probability of 2-photon excitation as a function of position:

$$E(X, t) = E(X, t) \int_{x=-L/2}^{x=L/2} E(x, t)\exp(-2\pi i X x) dx$$

where x=spatial frequency in x direction, proportional to displacement in the x direction beneath a focusing lens $$I_{2P}(X,t)=(E(x,t) \times E(x,t)')^2 = \text{2-photon intensity}$$

(optical intensity squared, proportional to 2-photon excitation)
This model has been used herein to compute the distribution of 2-photon intensity vs X and time for a variety of aberrations superimposed on the fixed element 100 of the model and/or the traveling wave elements (see FIGS. 4-7 and 12 and below explanation for the modeling results).

Aberration Correction for Fixed Optics

With reference to FIG. 3, it will be appreciated that any practical optical system is not perfect. The lenses and other optical transmission devices will always introduce some aberration into the light. This aberration is modeled as fixed element 100 in FIG. 3. The inventors have found that one or more non-linear drive signals can be used to correct for fixed aberrations in the microscope system optics e.g. caused by spherical aberrations in the objective. Where the system aberrations are known, the AOD drive signals can be suitably calculated using the known aberrations to provide for system aberration correction. In other words, the functions $W^+_f(x,t)$ and $W^-_f(x,t)$ can be made to include third order and/or other higher order Taylor series terms that serve to put "inverse aberrations" into the light passing through the AOL. The inverse aberration is designed to precisely counter the aberration that is introduced by the optical system so that, when the objective lens 70 of objective optics 9 focuses the resulting light, a sharp focal point is obtained.

The focal point obtained when such aberration correction is used is better (sharper) than that obtained without the aberration correction. For example, suppose a known objective lens 70 is known to introduce spherical aberration to the light wave. This can be countered by using appropriate $4^{th}$ order terms in the Taylor series representing the drive signals. In such a case, the coefficient $P_{xt}(4)$ in the equations above is selected to provide the correct amount of "pre-aberration" to the light wave, so that the effect of the unwanted aberration that exists in the lens 70 is to cancel out the pre-aberration, thereby providing a perfect focused spot.

In general it is possible to correct for fixed aberrations having Taylor series coefficients $P_x(n)$ by compensation with a pair of counter-propagating wave functions driven with minus half the phase aberration, such that the Taylor series coefficient to use in each drive signal is given by:

$$P_{xt}(n) = \pm 0.5 P_x(n)/(\tau/2)^n$$

where
units of $P_{xt}$ are waves/time$^n$

According to the frame of reference here, the waves start to be propagated by the AODs at some negative time and each AOD is arranged to be just full of an acoustic wave at time t=0. At this time t=0, the 2 sets of half amplitude aberrations introduced into the AOD acoustic waves add together in space to exactly cancel out those fixed aberrations inherent in the system. At times other than t=0, the AOD aberrations do not precisely cancel out the fixed aberrations and together cause a drop in the intensity of the PSF, but this is seen as a gradual drop as time moves away from t=0 (in either direction) and the deleterious effects of this can be reduced by ensuring that measurements are taken around the precise time of maximum cancellation.

Figure 4:
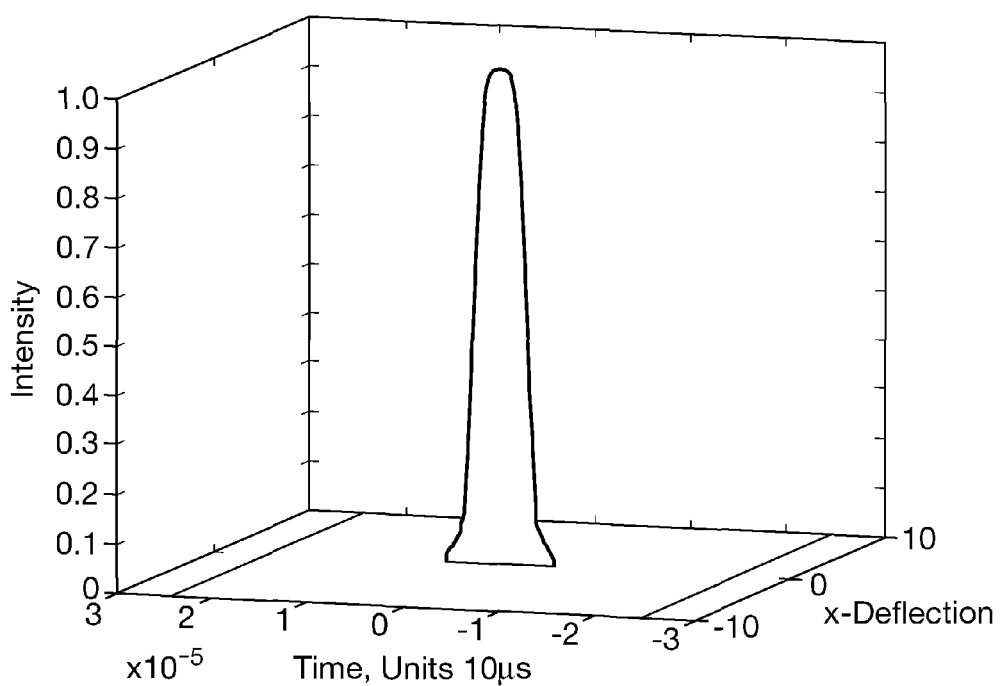
FIG. 4 is a graph showing the 2-photon intensity and how it varies with time as a fourth order aberration is corrected.

This effect can be seen in FIG. 4, which shows a computer simulation of the 2-photon intensity that can be achieved at a single position, where the system optics have an inherent fourth order aberration, such that the fourth order Taylor series coefficient of the aberration is $P_x(4)=1$, and where the two AOD drive signals are provided with fourth order driving terms using coefficients $P_{xt}(4)=-0.5$. as can be seen, at time t=0, perfect cancellation is seen. There is also an area around t=0 where good cancellation is seen and an area outside of this where substantially no cancellation is seen, such that the 2-photon signal drops to zero. The plot of 2-photon intensity forms a bell-shaped curve which in this example has a FWHM=5.4 μs. This time period is however sufficient to perform most experiments, where a dwell time of around 4 μs commonly used.

Figure 5A:
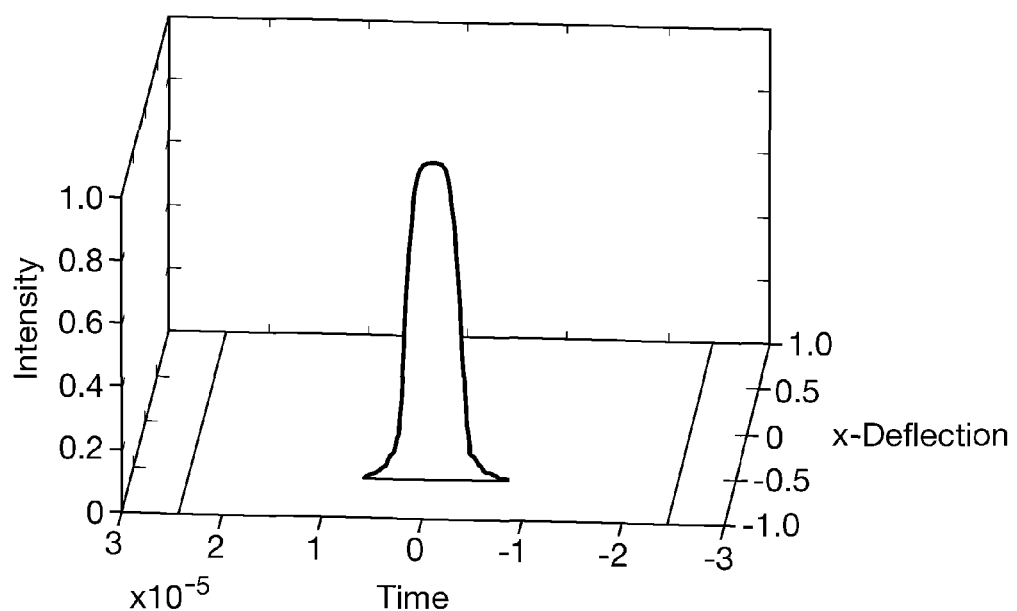
FIGS. 5a and 5b are graphs showing the 2-photon intensity and how it varies with time as a fourth order aberration is corrected while the spot is deflected in X.
Figure 5B:
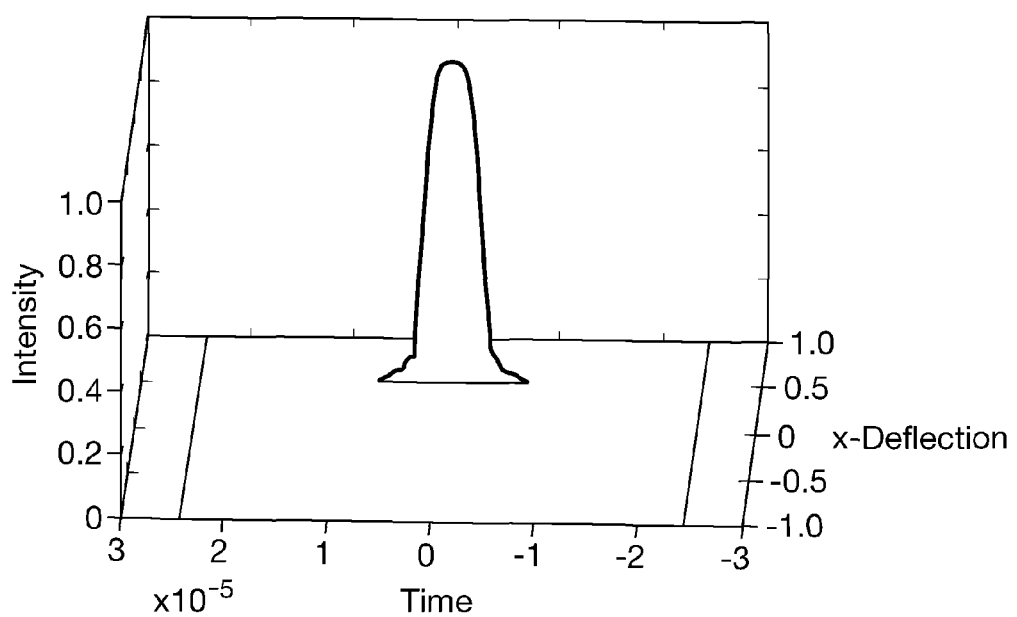

FIGS. 5a and 5b show that the amount of aberration correction possible is independent of any movement of the focal spot in X or Y that is achieved using first order Taylor series terms. In FIG. 5a, simulations of the X-Z AODs have been supplied with drive signals having different constant frequencies so as to produce an X deflection of about −5 mrads. As with the example of FIG. 4, a full wave of fourth order aberration is modeled to exist in the system optics which is being counteracted by drive signals containing fourth order components. As in FIG. 4, the intensity profile takes on a bell shaped curve in time and the FWHM of this curve is the same as in FIG. 4. FIG. 5b shows a similar result, but with an X deflection of +5 mrads. Again, the curve shape remains unchanged. This demonstrates that the first and fourth order terms act independently and that aberration correction can be applied however the spot is deflected in X or Y.

Figure 6A:
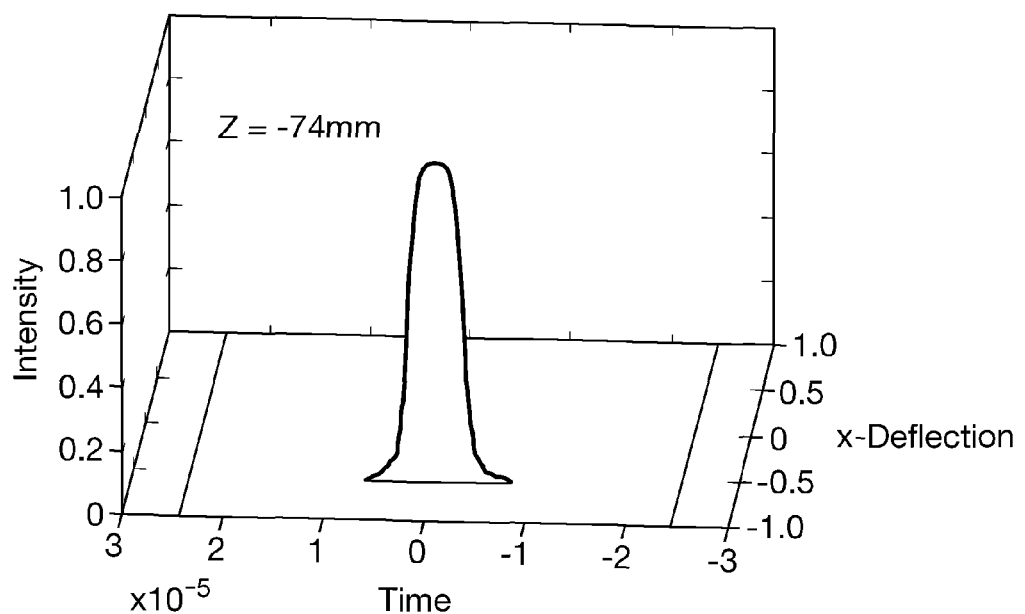
FIGS. 6a and 6b show how the aberration correction is independent of any focussing aberration that may be introduced.
Figure 6B:
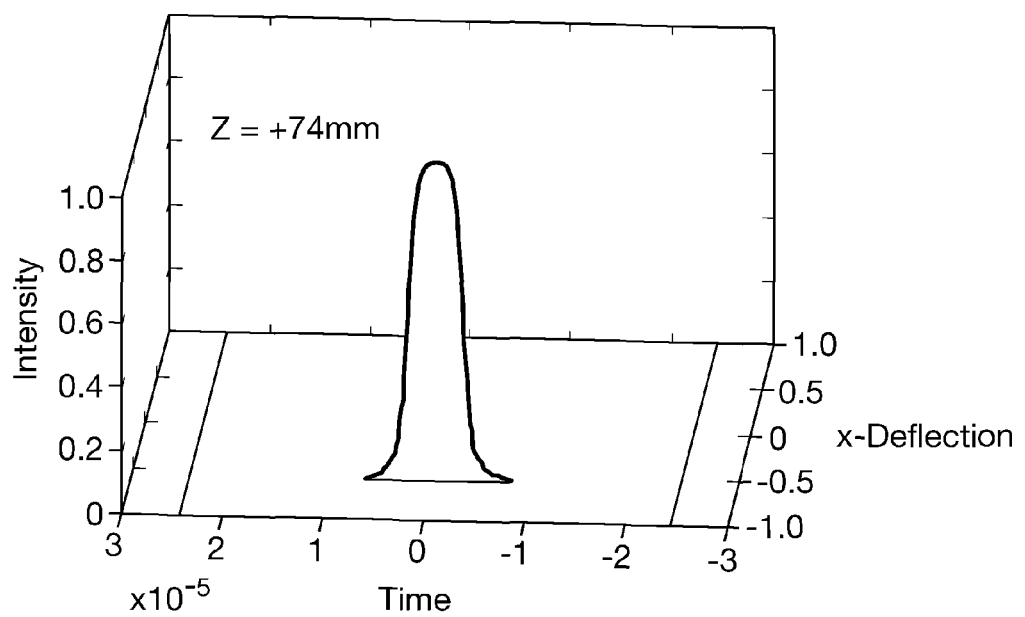

Modeling has also been carried out to investigate the effect of second order (i.e. Z focusing) terms on the aberration correction capabilities and it has been found that the aberration correction possible is not changed by moving the spot in Z using second order Taylor series terms. FIGS. 6a and 6b show two temporal aberration correction plots. In this case again a full wave of fourth order aberration is corrected, there is 5 mrad of tilt in both cases, but 35 waves of second order Pxt(2) 'focus' aberration is used in one case (FIG. 6b) to focus upwards by sufficient to produce 74 μm of Z focus beneath a subsequent NA=0.8 objective, and by changing the sign of Pxt(2) 74 μm down (FIG. 6a). There is no difference in the temporal behavior of the aberration correction demonstrating the independence in this case of aberration correction from Z focus.

FIG. 7 is similar to FIG. 4, but models a system aberration where $P_x(4)=0.5$ instead of 1. FIG. 7 thus models the case where the system induced aberration is less severe (by half) than the FIG. 4 example. Again, the aberration correction works perfectly at time t=0 and falls off as you move away from this instance. However, the fall-off is more gradual and the curve of FIG. 7 has a FWHM of 7.8 μs instead of 5.4 μs.

Figure 8:
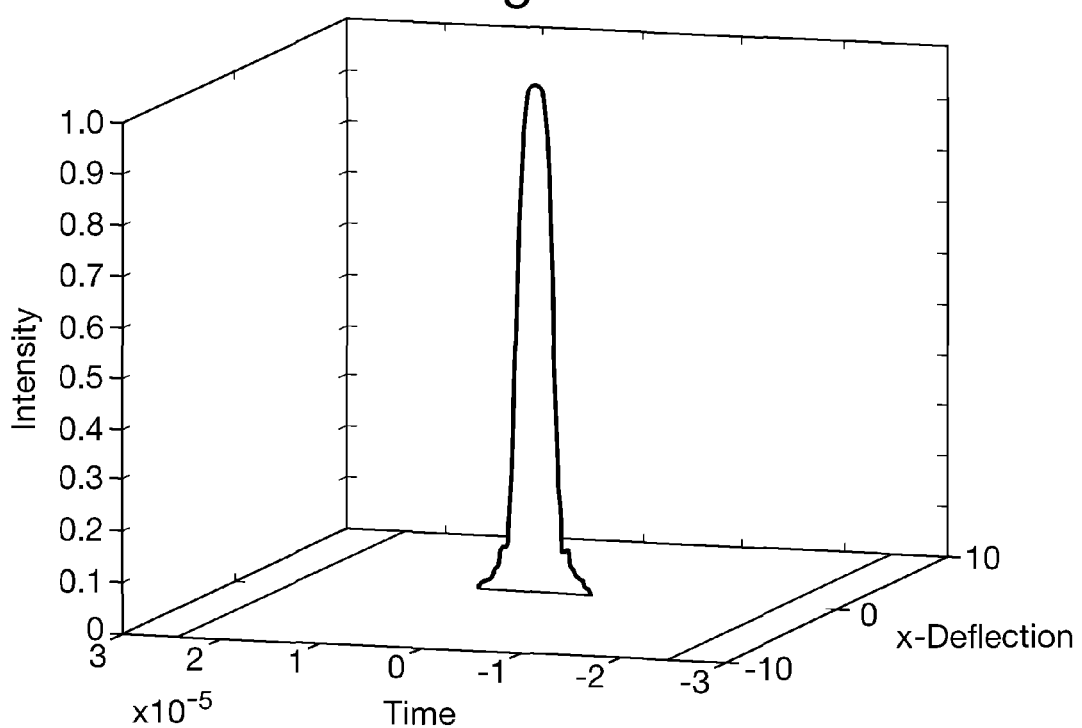
FIG. 8 is a graph similar to FIG. 4 but showing the 2-photon intensity and how it varies with time as a sixth order aberration is corrected.

FIG. 8 is similar to FIG. 4, but models the sixth order aberration instead of the fourth order aberration. FIG. 8 therefore assumes a system induced aberration of $P_x(6)=1$, which is countered by equal AOD drive signals having phase-modulation described by a Taylor series, where the sixth order coefficients $P_{xt}(6)$ are each selected to be −0.5. Again, correction is perfect at time t=0 and falls away, although here the fall-away is more rapid and in this case the FWHM of the resulting curve is 3.6 μs.

In some cases, it may not be possible to accurately measure the system aberration that is present. A system for fine-tuning the fixed aberration correction using an iterative method is therefore shown in FIG. 9.

According to this system and corresponding method, the drive signals to the AODs can be selectively provided with intentional aberrations which, when the acoustic wave is expressed as a Taylor series, exhibit themselves as one or more Taylor series coefficients greater than second order (i.e. third order or higher). These aberrations are iteratively superimposed on top of the normal drive signals needed to move the focal point to the desired position or with the desired scan, and it is checked whether an improvement is seen in the resulting image. A special controller 12 is used for this. The controller 12 includes an aberration generator 13 that generates a first aberration. This first guess can be based on what is already known about the system. The controller 12 thereafter receives the output of the detector 10 and looks at this output as a function of time. The controller can then determine whether the aberration that was determined by the aberration generator and introduced into the light has improved the image or not. This determination is then used to influence the generation of the second aberration by the aberration generator 13 and this second aberration is applied to the light by the AODs. This cycle continues and gradually the aberration generator homes in on a form of aberration that provides the best image. In this way, a feedback system is set up that seeks to iteratively derive the aberrations that exist in the system optics and automatically correct for them by providing canceling aberrations to the AOD drive signals. A memory is preferably used to store the aberrations that are derived. These aberrations can be conveniently expressed as the Taylor series coefficients $P_{xt}(n)$ needed for each order n. Many orders can be stored or the system can be limited to experiment with, and store, only a few higher orders, such as n=3 and n=4 only. A very simple embodiment works by using the fourth order term $P_{xt}(4)$ only, to correct any spherical aberration in the system. In such a case, the aberration generator has the simple task of decreasing or increasing the coefficient in response to the observed effect and the memory need only store a single data value relating to $P_{xt}(4)$.

It has been found that non-sinusoidal phase-modulation is preferred to effect aberration correction. It is very unlikely that the aberration that exist in the system will be perfectly corrected by sinusoidal phase-modulation. In principle sinusoidal phase-modulation introduces phase errors up to an infinite order with factorial reducing amplitude with order number. The present invention is concerned with deliberately selecting the values of the coefficients for each order. It has been found that the coefficient value required to effect good aberration correction generally gets smaller as the order increases and a coefficient that is larger than 3.2/n!, where n is the order of the coefficient, has been found to provide good results. The coefficients may be made larger still, e.g. greater than 3.5/n!, greater than 4/n! or greater than 5/n!.

As well as aberration correction using the AOD drive signals, aberration correction by way of fixed lens or other fixed systems may additionally be used.

As a sharper focal point can be achieved, system resolution can be consequently improved. Further, cheaper components can be used, reducing the system cost. The iterative method also allows the system to self-correct in response to changes in the system. Thus, if components are replaced or upgraded, the system is able to automatically recalibrate itself to some extent and this can save hours of potentially tedious work.

Dynamic Aberration Control

As well as correcting fixed aberrations arising from the system optics, the invention can also be used to modify the shape of the focal point spread function and for instance correct for aberrations arising in the object being studied, for example tissue samples such as brain tissue.

Figure 10:
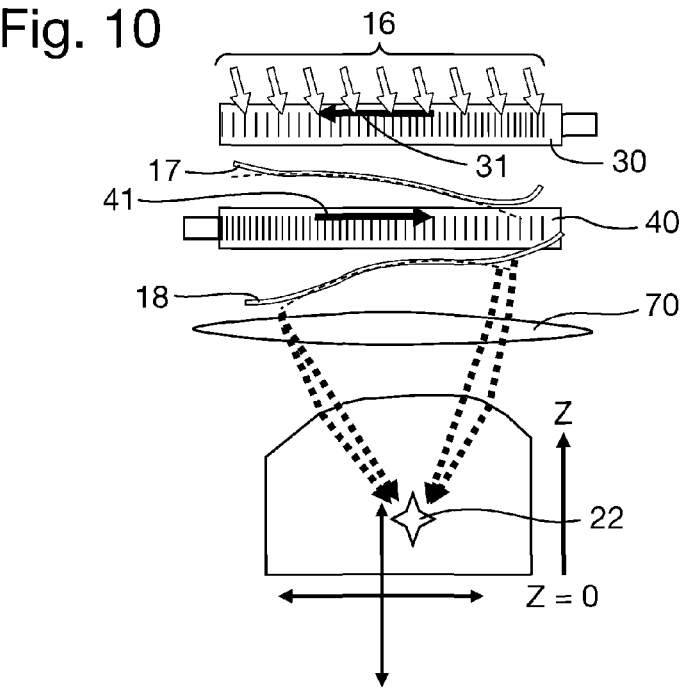
FIG. 10 shows two AODs and sample-induced aberration.

As such tissue samples can have non-homogenous refractive indices, the amount of aberration introduced by the tissue sample is often a function of the position in the sample where the light is focused. Non-linear FM drive signals can, according to this aspect of the invention, be determined that correct for aberrations in a manner that is dependent on the position of the focal spot in the tissue (or other specimen). FIG. 10 shows a pair of AODs 30, 40 that deflect an incoming light beam 16. An objective lens 70 is used to focus the light beam into a region of tissue 19, at some point below the surface. A focal spot 22 is formed within the tissue 19. Thanks to the non-homogenous refractive index of the tissue, and the fact that the tissue may have an irregular top surface 21, the aberration caused by the tissue 19 to the focused spot 22 is a function of the position of the spot 22. According to the invention, it is possible to build up a model of the aberration in the tissue vs X-Y-Z position (or just X-Z position if only two AODs are used). The model gives the aberration parameters that exist at each position in the tissue. These can conveniently be stored in a memory. Then, when performing experiments on the tissue, the system can refer to the stored parameters and apply the necessary corrections to the AOD drive signals to counteract the tissue-induced aberrations.

The model can be initially created by performing a raster scan of the tissue to be studied, starting scanning at the top of the tissue and gradually scanning deeper and deeper. The image results can be monitored and it is possible to incrementally correct for aberrations with the minimum modification to optimal corrections at each X-Y-Z position as the spot penetrates deeper and deeper into the tissue.

Figure 9:
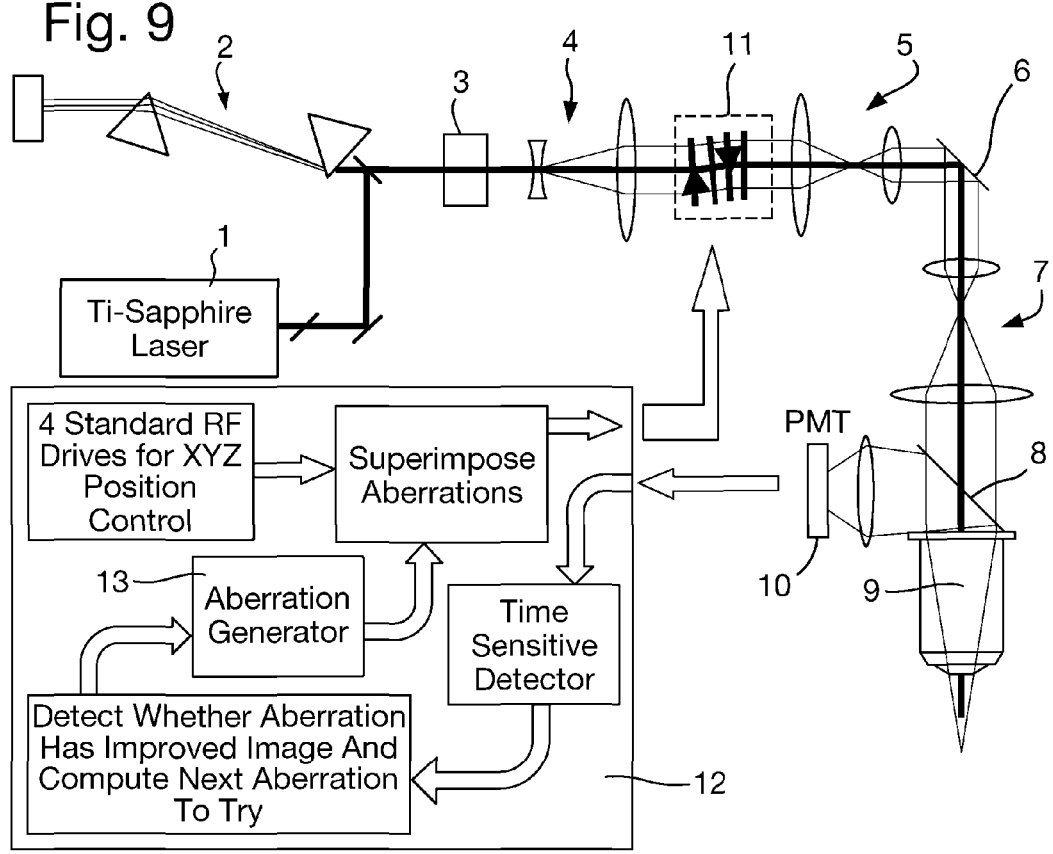
FIG. 9 shows a microscopy system according to the present invention that is adapted to automatically correct for aberrations.

In order to compute the correct drive parameters to produce a correctly pre-distorted wavefront at each position, one of the techniques that have already been demonstrated for optimizing the fluorescence signal from deep features could be adapted. Such methods are reviewed in *Adaptive Optics in Microscopy*, Martin J Booth, Phil. Trans. R. Society. A. 2007 365, 2829-2843. Here, optimization routines are disclosed that experimentally modify the wavefront with either a random sequence or a sequence of higher and higher order aberrations. For each aberration tested the image quality is monitored, often from a small bright fluorescent bead, and an optimization routine enables the system to iteratively home in on the optimum aberration correction for each position in the specimen. The system shown in FIG. 9 is suitable to perform this and obtain the initial tissue model.

As when correcting fixed aberrations, non sinusoidal phase-modulation is preferred and it is also preferred that at least one of the higher order (i.e. third order or above) coefficients are greater than $3.2/n!$.

Correcting for tissue (or other specimen) induced aberrations allows a sharper focal point to be obtained and so can increase the resolution of the overall system.

Focal Point Movement Including a Z Direction Component

For many applications it would be highly desirable to be able to scan along a complex path that twists and turns in all three directions. Further, for many applications, especially those in neuroscience, it is very desirable to perform this scanning very quickly, so as to capture information about fast moving processes. Such would be particularly useful for fast measurements of cellular subcompartments (e.g. neuronal dendritic trees) and voltage dye imaging, where the signal arises only from the plasma membrane. Neuroscientists are thus interested in tracing a focal point rapidly along a dendrite or tracking a point moving in 3D space.

The present invention allows very fast scanning in arbitrary directions to be achieved for the first time using an AOD system. The inventors have found that a third order Taylor series term (and preferably no other higher order terms) can be added to the phase-modulation of the drive signals to effect a pure movement of the focal spot in Z.

Figure 11:
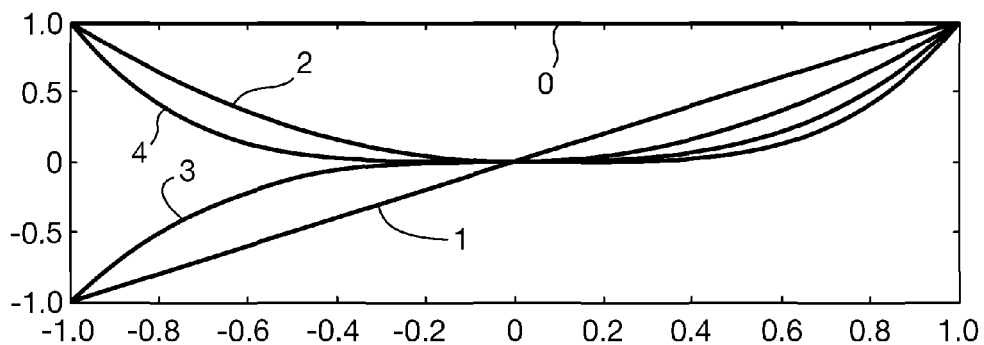
FIG. 11 is a graph plotting the phase error introduced by each order of aberration as a function of distance along the AOD aperture.

In the past, such third order terms were thought to introduce aberrations into the wavefront. Indeed, the third order term does introduce an aberration into the wavefront as it passes through each individual AOD. FIG. 11 shows the aberrations introduced by each order of Taylor series term in the phase-modulation of the drive signals.

A zeroth order term does not vary with X, and so is seen as a phase displacement of constant magnitude across the whole aperture of the AOD. This physically correlates to a constant stress or strain across the AOD which itself would not affect how the beam is diffracted.

A first order term varies as a linear function of X and so introduces a linear aberration across the AOD aperture. This can be regarded as a "tilt" aberration because, on its own, it causes the light to be deflected to the left (or the right) without changing the focus or other properties of the light. This term corresponds to a moving acoustic sinewave of constant frequency traveling across the AOD aperture at the speed of sound in the AOD crystal. Practitioners have already made use of this first order term in the prior art to deflect light using AODs. For example, in the system of WO 2008/032061, two AODs having counter-propagating and identical drive frequencies can be used to create a stationary spot focused in the Z=0 plane (see FIG. 7b of that document). As shown in FIG. 7b there, any tilt introduced by the first AOD is cancelled out by the opposite tilt introduced by the second (counter-propagating) AOD. Focusing at positions other than X=0 can be achieved by applying non-identical constant frequency drive waves to the two AODs. For example, if one AOD has a higher (constant) frequency than the other AOD, then it will tilt the beam more than the other AOD and focusing at a position other than X=0 will be seen.

A second order term varies as X squared, as shown in FIG. 11. This therefore provides a parabolic wavefront, as shown in FIGS. 7a and 7c of WO 2008/032061. As discussed there, the parabolic wavefront is achieved by using a drive signal having a frequency chirp, that is a frequency that linearly changes with time. The parabolic wavefronts allow the beam to be made to converge or diverge, which is ultimately transformed by the objective lens 70 into focusing at non-zero values of Z. The second order term is therefore connected with focusing at non-zero Z positions. Note that for large Z displacements the objective optics is unlikely to be designed to produce a perfectly converging spherical wavefront from the perfectly parabolic linearly frequency chirped AOD wavefront. Thus At high Z displacements higher order (e.g. fourth order Px(4)) terms may need to be introduced in order to form optimal point spread functions.

From FIG. 11, it can be seen that odd and even order terms behave differently when applied to counter-propagating AODs. The even terms look the same whichever way the drive signal is propagating. Thus, a drive signal having only even order terms will look the same whether it is propagated from left-to-right or from right-to-left. This can be seen by noting the symmetry around the X=0 line of the even terms in FIG. 5.

The odd terms however look to have opposite magnitudes depending on the direction of propagation. A drive signal phase modulated by only a first order term creates a non-symmetric pattern across the AOD aperture. This can be seen in FIG. 11. It can also be seen in FIG. 7b of WO 2008/032061, where the first order tilt terms cancel each other out. This can be contrasted with FIGS. 7a and 7c of WO 2008/032061, where the second order focus terms constructively combine, rather than canceling each other out.

Thus, because the third order term is an odd order, the aberration across the first half of the AOD has the same magnitude but opposite sign to the aberration across the second half of the AOD, as shown in FIG. 11. The inventors have thus found that if a pair of equal third order terms is used to phase modulate the drive signals in counter-propagating AODs, the aberrations introduced by each AOD cancel each other out in space. However, the time-varying second order (parabolic) component is not cancelled out and so the focal point is caused to move smoothly and perfectly in the Z direction.

FIG. 8 of WO 2008/032061 shows what the known drive signals look like when the frequency is mapped temporally and spatially. As can be seen there, the separation of the frequencies controls the focal spot position in X whereas the slope of the frequency graph controls the spot position in Z.

Figure 12:
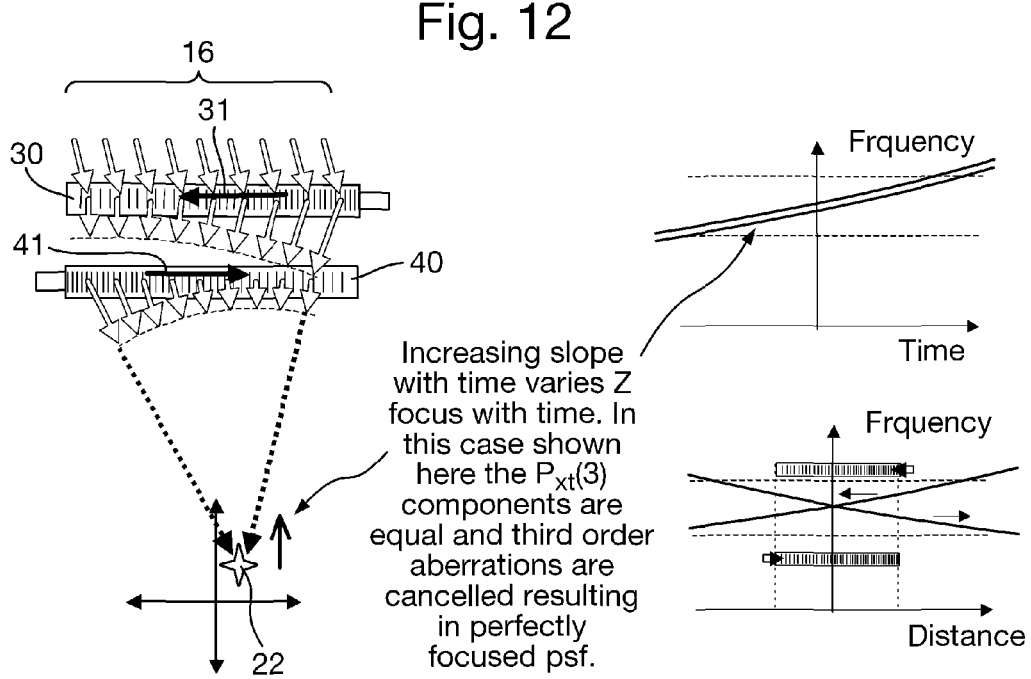
FIG. 12 shows how a pure third order term causes a non-linear frequency chirp and creates a spot smoothly moving in Z.

FIG. 12 is a similar drawing but shows the effect of adding a third order term to the phase-modulation of the drive signals. As can be seen, the effect of the third order term is to transform the known linear frequency ramps into non-linear ramps. In FIG. 12 the frequencies are made to increase with time. The effect of this is to smoothly cause the position of the spot to move upwards in Z.

The use of a pure third order term (i.e. without any fourth order or other higher order terms) is preferred to effect aberration-free Z-scanning The controller 12 is preferably arranged to synthesize the drive signals such that an incoming beam of electromagnetic radiation is focused by the subsequent objective optics 9 to a point spread function that smoothly moves with a component in the Z-direction and which has a maximum peak intensity that is unchanging to within acceptable limits say 20% as the point spread function moves in the Z-direction during a mini-scan. This is practically achieved by the present invention by using a third order term.

The controller 12 is also preferably arranged to synthesize the drive signals such that the incoming beam of electromagnetic radiation is focused by the subsequent optics 9 to a point spread function that moves with a component in the Z-direction and which has a FWHM width that is unchanging to within 40% as the point spread function moves in the Z-direction during a mini-scan.

Both the relatively constant peak intensity, and the relatively constant PSF width can be achieved using the preset invention thanks to the presence of the third or higher order terms. The third order term serves to scan in Z and the higher order terms serve to correct any aberrations.

It is included within the present invention to combine any or all of fixed aberration correction, dynamic aberration correction and Z-scanning. This can be achieved simply by superimposing (adding together) the drive individual drive signals needed for each task and using the resulting signal to drive the AODs.

Figure 13A:
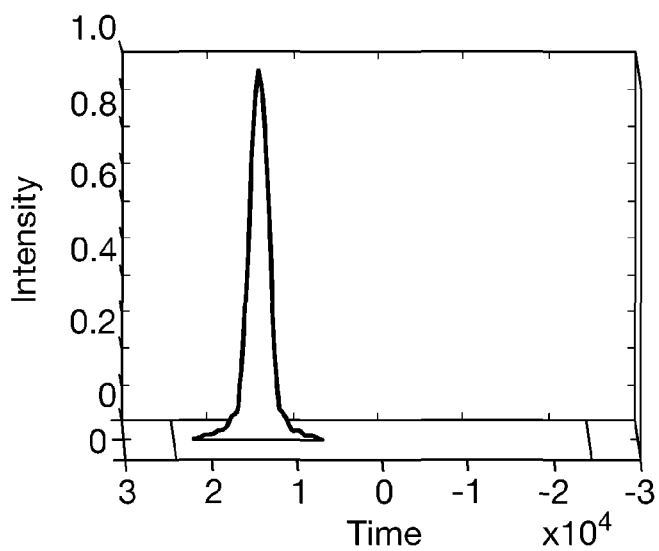
FIGS. 13a, 13b and 13c are graphs showing the 2-photon intensity and how it varies with time as a spot is scanned in Z.
Figure 13B:
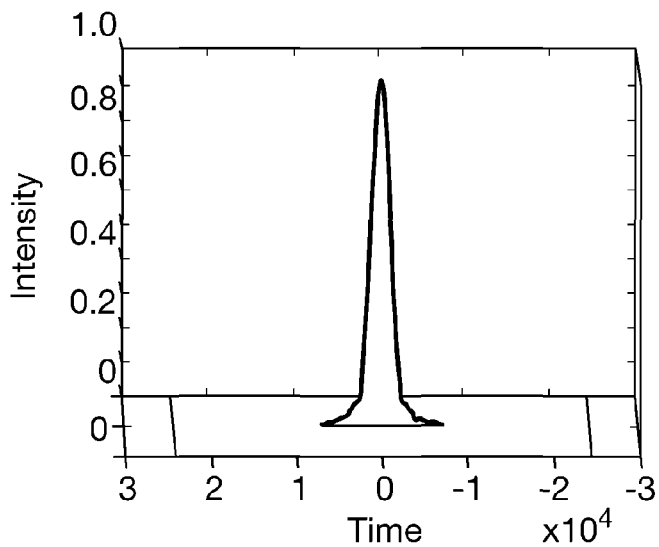
Figure 13C:
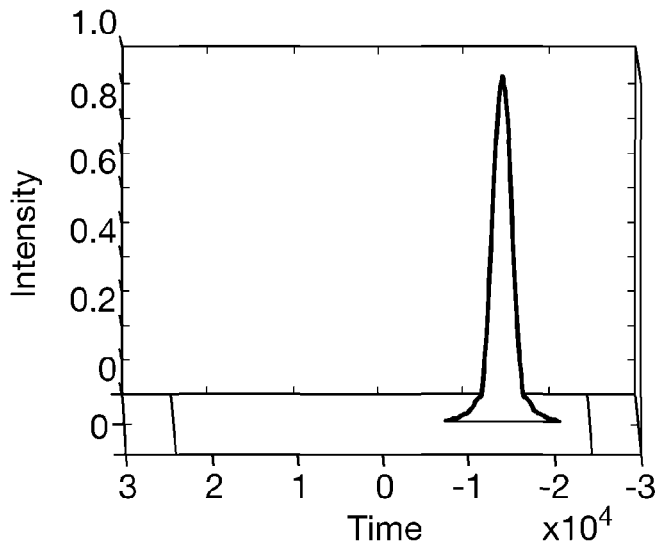

Movement of a perfectly focused spot in the Z direction has been demonstrated by computer modeling and is shown in FIGS. 13a-13c. In these Figures, normalized 2-photon intensity is plotted along the Y-axis and time is shown along the X-axis. The Z-axis shows the position in X.

FIGS. 13a-13c show the simulated focus intensity vs time and X displacement at 3 different particular focal depths. FIG. 13a corresponds to a focal depth that would be +15 μm above the natural focal plane of an NA=0.8 objective, FIG. 13b, corresponds to the natural focal plane and FIG. 13c a distance of 15 μm below the natural focal plane. It can be seen that the peak intensity in all three cases is 1 which corresponds to perfect diffraction limited focusing and that the times of peak intensity at each focal plane are +14, 0 and −14 μs, consistent with a linear movement of the Z focal spot with time, By using algebraic rearrangement of the earlier equations for $W_f(x,t)$ and combining them with basic geometric optics, it is straightforward to show that the Z displacement $\delta Z$ beneath an objective lens coupled to the AOL so that the AOL projects a light beam of a known effective numerical aperture NA to the focal spot, is given by:—

$$\delta Z = \frac{3P_{xt}(3)L^2 r \lambda t}{V^2 NA^2}\left(1 - \frac{NA^2}{r^2}\right)$$

where
λ, is the wavelength of light
r is refractive index beneath the objective

Figure 14:
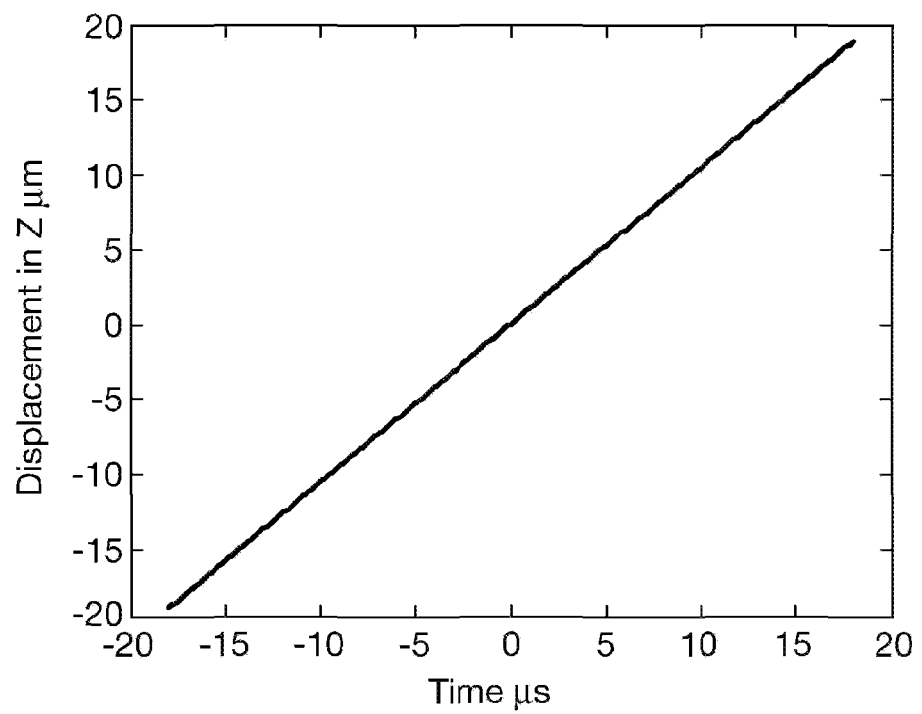
FIG. 14 is a graph showing that smooth Z-scanning can be achieved using the present invention.

The fact that this equation is linear in time confirms that the Z displacement is at a constant velocity. A plot of the Z displacement vs time for Pxt(3)=1 wave, L=15 mm, NA=0.8 r=1.33 (water) is shown in FIG. 14.

In general, a third order term can be combined with the known zeroth, first and second order terms to create a scan path that moves arbitrarily in 3D space. When using solely the zeroth to second order terms and pairs of cancelling third order terms, no aberration to the spot focus is introduced. This is useful for scanning specific sub-regions of 3D space and is particularly useful for fast measurements of cellular subcompartments (e.g. neuronal dendritic trees) and voltage dye imaging, where the signal arises only from the plasma membrane. By just scanning membrane regions, recordings with higher temporal resolution and better SNR can be achieved.

The system is also useful for high speed 3D optical tweezers. It allows translation of stationary spots in any 3D direction which can be used for moving objects trapped in the focal spot in 3D.

Cyclic Movement of Focal Point in 3D

When the pointing mode is to be used, several points in 3D space are initially identified and the beam is then made to be focused successively at each point for a certain dwell time. Typically, before the points can be identified, it is usually necessary to scan the 3D space with a raster scan to determine what is there, then examine the scan and pick out the points of interest. This can take some considerable time and it is desirable to improve upon this.

This aspect of the present invention can be used to reduce the total scan time, especially when an object that is sparse (i.e. small in volume compared to total possible scan volume) is being scanned.

For example, a neuron can be filled with dye and the invention can be used to trace out its body and dendrites using an algorithm that controls the position of the next point in terms of the brightness results of the recently measured points.

The invention includes a 3D randomized scanning process that, after finding a bright object, only visits local points near to where bright fluorescence has already been found. This enables a bright object to be traced out without needing to visit all of the points in the full scannable 3D volume. The present invention allows such local sparse scanning to take place at high speed.

Figure 15:
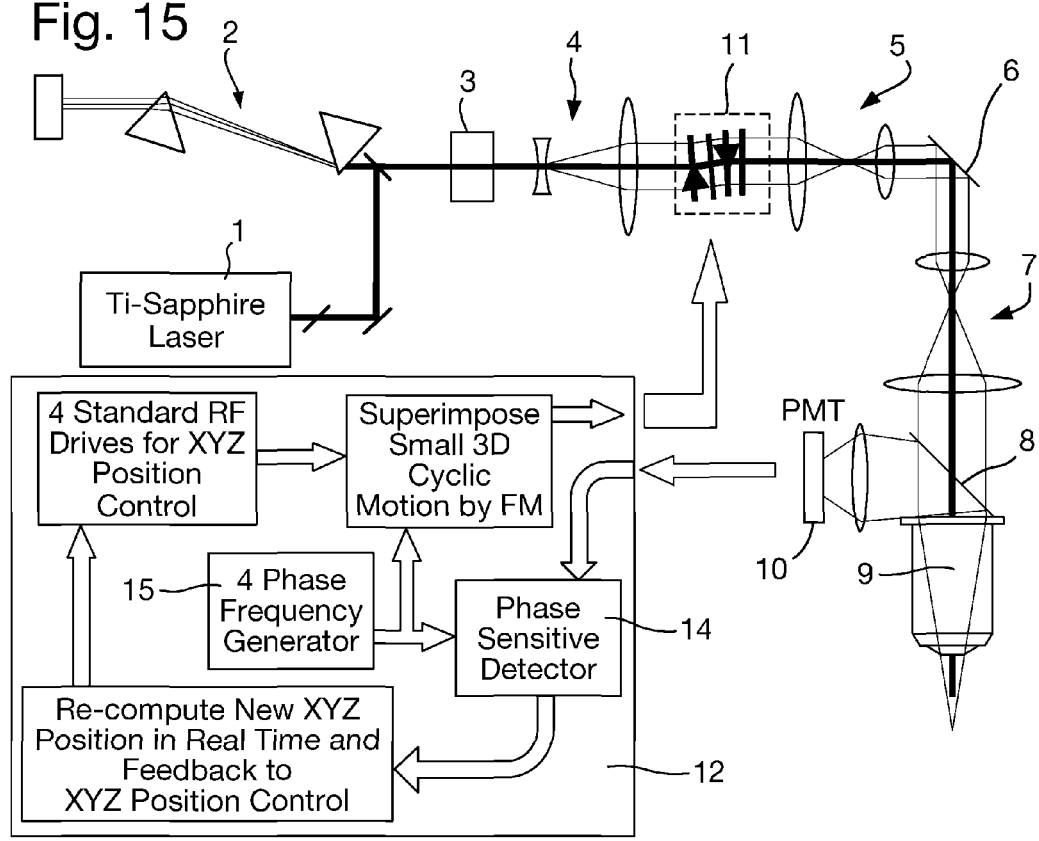
FIG. 15 shows a microscopy system according to the present invention that is adapted to perform cyclic spot displacements for use in tracking features.

The apparatus is shown in FIG. 15. The apparatus is similar to that shown in FIG. 1, although the controller 12 is modified. As well as the above described means to create the standard drive signals and the drive signals having aberration correction or Z-scanning components, the controller also includes a phase sensitive detector 14 and a four-phase frequency generator 15. According to the implemented method, a spot within the 3D volume is first selected by the controller 12, or by a user programming the controller 12. This is preferably selected to be a spot where there is a high likelihood of hitting an object, or better still where it is known that an object of interest exists. The drive signals to cause pointing at that spot are then computed by the controller 12 and applied to the AOL 11. The four phase frequency generator 15 is used to create four cyclic waveforms (which can be sinusoidal, but need not be) preferably having different amplitude and phase. The cyclic FM waveforms are superimposed on top of the standard drive signals. Different amplitude and phase cyclic FM signals are preferably superimposed on the linear drive signals to each AOD forming the AOL 11. At low superimposed FM drive frequencies less than the inverse of the AOD aperture fill time, this causes cyclic movement of the focal spot in a 3D space with no significant aberration. As the frequency increases above the inverse AOD fill time, so the spot movement speeds up; however the wavefront aberration can become significant if the amplitude of modulation is too large. An amplitude and frequency of drive is chosen by the controller 12 to produce a rapid cyclic motion of the point spread function with a diameter of up to for example 0-10 times the point spread function dimensions. The signals detected by detector 10 are then monitored with a phase sensitive detector 14 that has the cyclic modulation derived by generator 15 as an input. This makes it easy to measure what part of each cycle is brightest and what is darkest. This information provides a rapid and precise measure of the local 3D fluorescence gradient and divergence with respect to the mean centre of the oscillating point spread function. This information is used by a rapid feedback algorithm implemented in the controller 12 to compute where next to direct the centre of the oscillating point spread function. The standard drive signals are then updated accordingly by the controller 12. In this way it is possible for the system to rapidly trace out and image an object in space, such as the body and dendrites of a neuron. The system can also be used to track small particles moving in 3D space. (Note that at high speed and high modulation depth there may be variation of 2 photon intensity resulting from cyclic variation of focal aberration and this may need to be allowed for in the control system.)

The phase sensitive detector 14 can use the known boxcar detection of the repetitive signal. This differential detection mode enables common mode signals such a fluorescence from other less tightly focused parts of the illuminating laser beam to be eliminated by subtraction and further improves signal to noise ratio of the wanted fluorescence from the fine feature.

Figure 16:
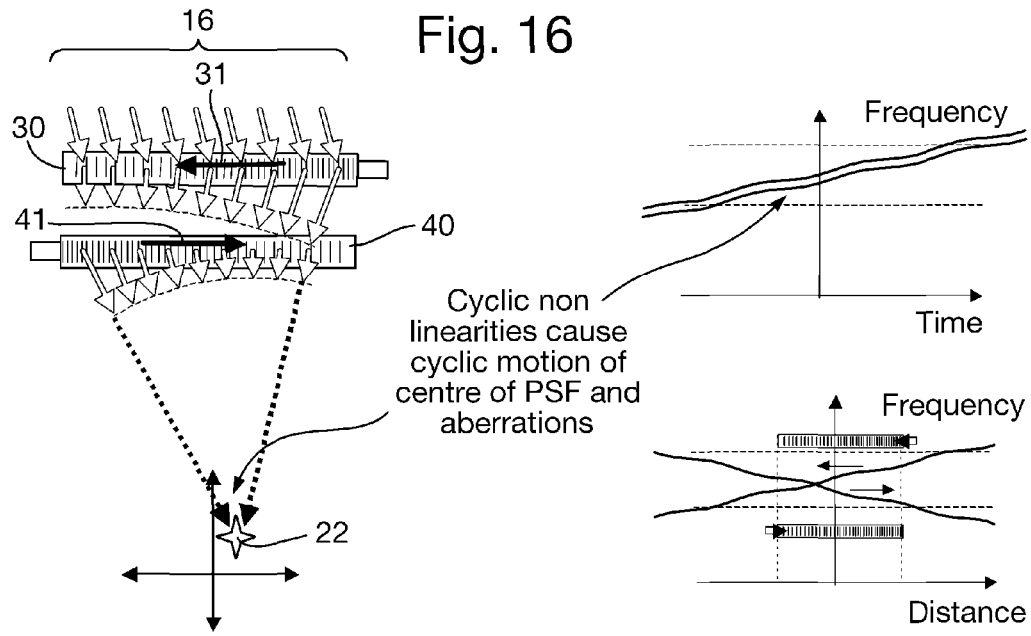
FIG. 16 shows how a cyclic higher order term causes a non-linear frequency chirp and creates a spot cyclically moving about a mean position.

FIG. 16 is similar to FIG. 12 but shows the effect of adding a cyclic term to the phase-modulation of the drive signals. As can be seen, the effect of the cyclic order term is to transform the known linear frequency ramps into non-linear ramps that oscillate about a mean position defined by the linear ramps. In FIG. 16 the frequencies are made to oscillate about a (possibly time varying) mean frequency and this causes the spot position 22 to oscillate about some mean position with time.

The invention thus allows close to real-time tracking of fine structured objects embedded in a deformable medium e.g. synapse boutons or dendrites embedded in live neural tissue. The invention thus enables the strongest and highest speed fluorescence signal to be constantly maintained from fine features despite deformation or movement of tissue. This can find application when making in-vivo measurements, where for instance movement of the animal or tissue deformation from pulsating blood supply are natural and otherwise serve to make accurate measurements difficult or impossible.

The invention further makes it possible to achieve high SNR functional optical imaging. Some fluorescent dyes bleach readily or can be driven into long lived dark states with excessive illumination. Moreover, dwelling for long periods at one location during static pointing can cause photodamage of tissue. This aspect of the invention can be used to keep the PSF constantly moving, thereby circumventing these effects because the illumination energy is spatially distributed and there is then time for diffusion of unbleached dye into the illuminated volume. For measurements from many specific locations clustered around otherwise sparsely distributed points in 3D space, a good solution is to use a local cyclic scan of the PSF around each point as described above.

The invention also serves to increase the efficiency of photo-activation or photolysis compared to static pointing, by reducing localized saturation effects. This could be beneficial for 2-photon activation of optogenetic proteins such as Channelrhodopsin, for example.

Other Applications

The invention can be used generally to correct aberrations occurring in the system for any reason. The paper "*Fast two photon in vivo imaging with three-dimensional random-access scanning in large tissue volumes*" by Katona et al, Nature Methods, published online on 8 Jan. 2012 describes a system that uses a second pair of AODs having a large (approx 40 degree) walk-off angle. This compares with the system of WO2008/032061 which uses a smaller walk-off angle (approx 20 degrees). A larger walk-off angle in the second pair of AODs allows a larger an overall angle to be scanned, but creates significant aberration, especially at strong Z-focussing. The effect is like tilting a magnifying glass and the result, if left uncorrected, is to increase the size of the point spread function, reducing system resolution.

The present inventors have found that this aberration caused by the large walk-off angle is a coma (third order) aberration. This aberration can be corrected according to the present invention by introducing appropriately signed and scaled (i.e. aberration cancelling) third or fourth order phase aberrations into the RF drive wave functions.

For example, for a system where NA=0.8 and the aperture is 15 mm, the effect of changing from a 20 degree walk off angle to a 40 degree walk off angle is to increase the coma aberration to greater than 0.25 of a wavelength even for a relatively small Z-focus of 125 μm. This aberration can be reduced to zero, in principle, by applying an appropriate magnitude of third order component to the drive signals.

The present invention is thus applicable to a wide range of physical configurations, including those where AODs are coupled by telecentric relays, those using the compact configuration of AODs disclosed in WO2008/032061 and those using the AOD configuration described in WO2010/076579 and the paper by Katona et at mentioned above. Further the invention is applicable over a wide range of AOD walk-off angles, including the more narrow angles of WO2008/032061 as well as the wider angles in the Katona et al paper.

The present invention is thus seen to comprise a microscope system and a method for imaging objects. The invention also includes the driver itself and a method for determining drive signals. The method of deflecting radiation is also included within the scope of the invention.

The invention claimed is:

1. An acousto-optic lens comprising:
   a first acousto-optic deflector arranged to support a first acoustic wave;
   a second acousto-optic deflector arranged to support a counter-propagating second acoustic wave;
   a driver for synthesizing first and second drive signals for said respective first and second acousto-optic deflectors;
   wherein said driver is arranged to synthesize a first drive signal that is phase-modulated by a non-sinusoidal first function that is capable of being expressed as a Taylor series having one or more coefficients greater than second order;
   wherein said driver is arranged to synthesize a second drive signal that is phase-modulated by a non-sinusoidal second function that is capable of being expressed as a Taylor series having one or more coefficients greater than second order; and
   wherein said acousto-optic lens further comprises:
   a memory for storing drive parameters associated with respective focal positions in space, wherein said acousto-optic lens is arranged to use said stored drive parameters when it is intended to focus electromagnetic radiation at a respective position in space.

2. The acousto-optic lens of claim 1,
   wherein at least one of said Taylor series coefficients greater than second order has a magnitude of at least 3.2 divided by the factorial of the order of the at least one of said Taylor coefficients.

3. An acousto-optic lens comprising:
   a first acousto-optic deflector arranged to support a first acoustic wave;
   a second acousto-optic deflector arranged to support a counter-propagating second acoustic wave;
   a driver for synthesizing first and second drive signals for said respective first and second acousto-optic deflectors;
   wherein said driver is arranged to synthesize a first drive signal that is phase-modulated by a first function that is capable of being expressed as a first Taylor series having one or more coefficients greater than second order, wherein at least one of said first Taylor series coefficients greater than second order has a magnitude of at least 3.2 divided by the factorial of the order of the at least one of said first Taylor coefficients;
   wherein said driver is arranged to synthesize a second drive signal that is phase-modulated by a second function that is capable of being expressed as a second Taylor series having one or more coefficients greater than second order, wherein at least one of said second Taylor series coefficients greater than second order has a magnitude of at least 3.2 divided by the factorial of the order of the at least one of said second Taylor coefficients; and
   wherein said acousto-optic lens further comprises:
   a memory for storing drive parameters associated with respective focal positions in space, wherein said acousto-optic lens is arranged to use said stored drive parameters when it is intended to focus electromagnetic radiation at a respective position in space.

4. The acousto-optic lens of claim 1,
   wherein said first drive signal is such that said first acoustic wave alone would cause at least a hundredth of a wavelength of phase error in a beam of electromagnetic radiation passing through said first acousto-optic deflector; and
   wherein said second drive signal is such that said second acoustic wave alone would cause at least a hundredth of a wavelength of phase error in a beam of electromagnetic radiation passing through said second acousto-optic deflector.

5. The acousto-optic lens of claim 4,
   wherein a beam of electromagnetic radiation that has passed through said first and second acousto-optic deflectors and that has been brought to a focus by a subsequent lens has a phase error that is smaller than half a wavelength.

6. The acousto-optic lens of claim 1, wherein the first and second acoustic waves are capable of being represented by respective wave functions in the form of a Taylor series as follows:

$$W_f^+(x, t) = A\exp\left(2\pi i\left(f(t - x/V_{ac}) + \sum_{n=0}^{n=N} P_{xt}(n)\left(\frac{t - x/V_{ac}}{\tau/2}\right)^n\right)\right)$$

$$W_f^-(x, t) = A\exp\left(2\pi i\left(f(t + x/V_{ac}) + \sum_{n=0}^{n=N} P_{xt}(n)\left(\frac{t + x/V_{ac}}{\tau/2}\right)^n\right)\right)$$

where
x=lateral distance coordinate measured from centre of AOD
t=time measured from centre of wave function
$V_{ac}$=speed of sound wave in crystal
f=reference centre frequency of AOD drive
$W_f^+(x,t)(W_f^-(x,t))$=wave function propagating towards +x (−x)
A=amplitude of wave function
$P_{xt}(n)$=Coefficient n of Taylor series
units are waves (of aberration) measured at $t-x/V_{ac}=\tau/2$
N=highest order of aberation considered
L=length of AOD
$\tau=L/V_{ac}$=AOD fill time
N≥3.

7. The acousto-optic lens of claim 1,
   wherein said drive signals are phase or frequency modulated so as to partially or substantially correct aberrations arising in an optical system.

8. The acousto-optic lens of claim 1,
   wherein said drive signals are phase or frequency modulated so as to partially or substantially correct aberrations arising in a specimen.

9. The acousto-optic lens of claim 1,
   wherein when said acousto-optic lens is oriented substantially in an X-Y plane such that electromagnetic radiation impinges upon it travelling in the −Z direction, said first and second acoustic waves would diffract said electromagnetic radiation so that, subsequent to an objective lens, it would form a focused point that smoothly travels with at least a component in the −Z or Z direction.

10. The acousto-optic lens of claim 1,
    wherein said driver is arranged to synthesize drive signals that are phase-modulated to the third order but with substantially no components greater than third order.

11. The acousto-optic lens of claim 1,
    wherein said driver is arranged to synthesize drive signals that are phase-modulated to the third order and is further arranged to additionally add in components greater than third order that serve to correct aberrations arising in an optical system or in a specimen under examination.

12. The acousto-optic lens of claim 1,
wherein said drive parameters are the coefficients of a series expansion of the wave functions representing the phase or frequency modulation of the respective first and second acoustic waves.

13. The acousto-optic lens of claim 1, further comprising:
a third acousto-optic deflector;
a fourth acousto-optic deflector;
wherein said third and fourth acousto-optic deflectors are for deflecting said beam of electromagnetic radiation in a direction having a component perpendicular to the direction in which said first and second acousto-optic deflectors deflect said beam of electromagnetic radiation;
said driver being for synthesizing third and fourth drive signals for said respective third and fourth acousto-optic deflectors;
wherein said driver is arranged to synthesize a third drive signal that is phase-modulated by a third function that is capable of being expressed as a Taylor series having one or more coefficients greater than second order, and
wherein said driver is arranged to synthesize a fourth drive signal that is phase-modulated by a fourth function that is capable of being expressed as a Taylor series having one or more coefficients greater than second order.

14. A microscope comprising:
the acousto-optic lens of claim 1; and
objective optics.

15. A method for determining drive signals of an acousto-optic lens for use in deflecting a beam of electromagnetic radiation with said acousto-optic lens, said method comprising:
storing drive parameters associated with respective focal positions in space,
using said stored drive parameters to determine a first drive signal that is phase-modulated by a non-sinusoidal first function that is capable of being expressed as a Taylor series having one or more coefficients greater than second order, and
using said stored drive parameters to determine a second drive signal that is phase-modulated by a non-sinusoidal second function that is capable of being expressed as a Taylor series having one or more coefficients greater than second order,
wherein said first and second drive signals are for causing respective first and second acoustic waves to be propagated in an acousto-optic lens, so as to focus electromagnetic radiation at a respective position in space.

16. The method of claim 15,
wherein the first and second acoustic waves are capable of being represented by respective wave functions in the form of a Taylor series as follows:

$$W_f^+(x,t) = A\exp\left(2\pi i\left(f(t-x/V_{ac}) + \sum_{n=0}^{n=N} P_{xt}(n)\left(\frac{t-x/V_{ac}}{\tau/2}\right)^n\right)\right)$$

$$W_f^-(x,t) = A\exp\left(2\pi i\left(f(t+x/V_{ac}) + \sum_{n=0}^{n=N} P_{xt}(n)\left(\frac{t+x/V_{ac}}{\tau/2}\right)^n\right)\right)$$

where
x=lateral distance coordinate measured from centre of AOD
t=time measured from centre of wave function
$V_{ac}$=speed of sound wave in crystal
f=reference centre frequency of AOD drive
$W_f^+(x,t)(W_f^-(x,t))$=wave function propagating towards+x (−x)
A=amplitude of wave function
$P_{xt}(n)$=Coefficient n of Taylor series
units are waves (of aberration) measured at $t-x/V_{ac}=\tau/2$
N=highest order of aberation considered
L=length of AOD
$\tau=L/V$=AOD fill time
N≥3.

17. The method of claim 15, wherein said drive parameters are the coefficients of a series expansion of the wave functions representing the modulation of the respective first and second drive signals.

18. The method of claim 15, further comprising:
providing said first and second drive signals to respective first and second acousto-optic deflectors so as to cause respective first and second acoustic waves to propagate in said first and second acousto-optic deflectors for focusing an incoming beam of electromagnetic radiation.

19. The method of claim 15, further comprising:
determining third and fourth drive signals that will, when provided to the acousto-optic lens in addition to the first and second drive signals, cause an incoming beam of electromagnetic radiation to be focussed by objective optics in three dimensions during a time period;
wherein said third drive signal is phase-modulated by a third function that is capable of being expressed as a Taylor series having one or more coefficients greater than second order;
wherein said fourth drive signal is phase-modulated by a fourth function that is capable of being expressed as a Taylor series having one or more coefficients greater than second order.

20. A method for deflecting a beam of electromagnetic radiation using an acousto-optic lens, said method comprising:
determining first and second drive signals according to claim 15;
applying said first drive signal so as to cause a first acoustic wave to propagate in a first acousto-optic crystal;
applying said second drive signal so as to cause a second acoustic wave to propagate in a second acousto-optic crystal;
passing an incoming beam of electromagnetic radiation through said acousto-optic lens so as to deflect it.

21. An acousto-optic lens comprising:
a first acousto-optic deflector arranged to support a first acoustic wave;
a second acousto-optic deflector arranged to support a counter-propagating second acoustic wave;
a driver for synthesizing first and second drive signals for said respective first and second acousto-optic deflectors;
wherein said driver is arranged to synthesize a first drive signal that is phase-modulated by a non-sinusoidal first function that is capable of being expressed as a Taylor series having a third order coefficient but substantially no coefficients greater than third order; and
wherein said driver is arranged to synthesize a second drive signal that is phase-modulated by a non-sinusoidal second function that is capable of being expressed as a Taylor series having a third order coefficient but substantially no coefficients greater than third order.

22. The acousto-optic lens of claim 21,
wherein when said acousto-optic lens is oriented substantially in an X-Y plane such that electromagnetic radiation impinges upon it travelling in the −Z direction, said first and second acoustic waves would diffract said electromagnetic radiation so that, subsequent to an objective lens, it would form a focused point that smoothly travels with at least a component in the −Z or Z direction.

23. The acousto-optic lens of claim 21, further comprising:
a third acousto-optic deflector;
a fourth acousto-optic deflector;
wherein said third and fourth acousto-optic deflectors are for deflecting said beam of electromagnetic radiation in a direction having a component perpendicular to the direction in which said first and second acousto-optic deflectors deflect said beam of electromagnetic radiation;
said driver being for synthesizing third and fourth drive signals for said respective third and fourth acousto-optic deflectors;
wherein said driver is arranged to synthesize a third drive signal that is phase-modulated by a third function that is capable of being expressed as a Taylor series having one or more coefficients greater than second order, and
wherein said driver is arranged to synthesize a fourth drive signal that is phase-modulated by a fourth function that is capable of being expressed as a Taylor series having one or more coefficients greater than second order.

* * * * *